(12) United States Patent
Nakayama

(10) Patent No.: US 8,014,659 B2
(45) Date of Patent: Sep. 6, 2011

(54) IMAGE SHAKE CORRECTION APPARATUS AND IMAGE PICKUP APPARATUS

(75) Inventor: Tatsuyuki Nakayama, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/660,326

(22) Filed: Feb. 24, 2010

(65) Prior Publication Data
US 2010/0226632 A1 Sep. 9, 2010

(30) Foreign Application Priority Data

Mar. 4, 2009 (JP) ................ P2009-051099

(51) Int. Cl.
*G03B 17/00* (2006.01)
(52) U.S. Cl. ........................................ 396/55
(58) Field of Classification Search ............ 396/52, 396/55
See application file for complete search history.

(56) References Cited

U.S. PATENT DOCUMENTS

| 5,266,988 | A | 11/1993 | Washisu |
| 2006/0285840 | A1 | 12/2006 | Takahashi |
| 2007/0031134 | A1* | 2/2007 | Kuroda et al. ............... 396/55 |
| 2007/0154195 | A1* | 7/2007 | Irisawa et al. ............... 396/55 |
| 2008/0055571 | A1 | 3/2008 | Makii |
| 2008/0199166 | A1* | 8/2008 | Tojyo et al. ............... 396/55 |
| 2010/0003023 | A1 | 1/2010 | Takahashi |

FOREIGN PATENT DOCUMENTS

| JP | 03-186823 A | 8/1991 |
| JP | 2007-017957 A | 1/2007 |
| JP | 2008-064844 A | 3/2008 |

* cited by examiner

*Primary Examiner* — Clayton E Laballe
*Assistant Examiner* — Dennis Hancock
(74) *Attorney, Agent, or Firm* — Lerner, David, Littenberg, Krumholz & Mentlik, LLP

(57) ABSTRACT

An image shake correction apparatus includes: a fixed member; a pair of guide shafts; an intermediate member; a movable member; a movement restraining section; and a restrained section.

14 Claims, 22 Drawing Sheets

IMAGE SHAKE CORRECTION APPARATUS AND IMAGE PICKUP APPARATUS

BACKGROUND OF THE INVENTION

1. Field of the Invention

This invention relates to a technical field of an image shake correction apparatus and an image pickup apparatus. More specifically, the present invention relates to a technical field for achieving, in an image shake correction apparatus and an image pickup apparatus which include a fixed member, an intermediate member and a movable member, prevention of unnecessary rotational movement of the movable member in a plane perpendicular to the direction of an optical axis upon image shake correction and assurance of a smooth moving operation of the movable member.

2. Description of the Related Art

Some image pickup apparatus of video cameras, still cameras and so forth include an image shake correction apparatus which moves a lens or an image pickup device in a direction perpendicular to the direction of the optical axis of the lens or the image pickup device to carry out image shake correction.

One of such image shake correction apparatus is disclosed in Japanese Patent Laid-Open No. 2008-64844 (hereinafter referred to as Patent Document 1) which includes a base member or fixed member and a holding member or movable member having a lens or an image pickup device held thereon and movable in two directions perpendicular to the direction of the optical axis of the lens or the image pickup device with respect to the base member.

In the image shake correction apparatus disclosed in Patent Document 1, a guide shaft is attached to the fixed member and extends in a first direction perpendicular to the direction of the optical axis. A pair of supporting pieces are provided on the holding member and have elongated holes elongated in a second direction perpendicular to both of the direction of the optical axis and the first direction. The supporting pieces are supported for sliding movement on the guide shaft. An annular rolling preventing member is supported on the guide shaft and engages for sliding movement with a sliding groove which is formed on the holding member and extends in the second direction.

In the image shake correction apparatus, the holding member is moved in the first direction integrally with the rolling preventing member with respect to the base member under the guidance of the guide shaft. Further, the rolling preventing member is slidably moved along the sliding groove to move the holding member in the second direction with respect to the base member.

Since the rolling preventing member remains in a state wherein it is always inserted in the sliding groove, rotation of the holding member in a plane perpendicular to the direction of the optical axis is prevented upon movement of the holding member in the first direction and the second direction.

SUMMARY OF THE INVENTION

However, in the image shake correction apparatus disclosed in Patent Document 1, since the rolling preventing member is always kept inserted in the sliding groove, when force acting in a rotating direction in a plane perpendicular to the direction of the optical axis is applied to the holding member, the rolling preventing member is pressed against a side edge of the sliding groove.

As a result, a high load is applied to the moving operation of the holding member and obstructs smooth moving operation of the holding member. Further, depending upon the magnitude of the load, the holding member may fail to move with respect to the base member.

Therefore, it is desirable to provide an image shake correction apparatus and an image pickup apparatus which can achieve prevention of unnecessary rotational movement of a movable member in a plane perpendicular to the direction of an optical axis upon image shake correction and assurance of smooth moving operation of the movable member.

According to an embodiment of the present invention, there is provided an image shake correction apparatus including a fixed member fixed in three directions including a direction of an optical axis, a first direction perpendicular to the direction of the optical axis, and a second direction perpendicular to both of the direction of the optical axis and the first direction, a pair of guide shafts supported on the fixed member so as to extend in the first direction and disposed in a spaced relationship from each other in the second direction, an intermediate member supported on the pair of guide shafts for movement in one of the first and second directions but against movement in the other of the first and second directions with respect to the fixed member, a movable member having a lens or an image pickup device held thereon and supported on the pair of guide shafts for movement in the first and second directions with respect to the fixed member and for movement in the other of the first and second directions but against movement in the one of the first and second directions with respect to the intermediate member, a movement restraining section configured to restrain the movement of the movable member in the one of the first and second directions with respect to the intermediate member or restrain the movement of the intermediate member in the other of the first and second directions with respect to the fixed member, and a restrained section provided on the movable member or the intermediate member for being engaged at least at two locations thereof by the movement restraining section in the second direction, the intermediate member and the movable member being moved integrally with each other in the one of the first and second directions with respect to the fixed member while the movable member is moved in the other of the first and second directions with respect to the fixed member to carry out correction of image shake.

In the image shake correction apparatus, the movable member is supported on the pair of guide shafts extending in the first direction and disposed in a spaced relationship from each other in the second direction. In this state, the movement of the movable member with respect to the intermediate member or the movement of the intermediate member with respect to the fixed member is restrained.

With the image shake correction apparatus, rotation of the movable member in a plane perpendicular to the direction of the optical axis upon movement of the movable member in the first direction and the second direction is prevented, and smooth movement of the movable member in the first direction and the second direction can be assured.

Preferably, the image shake correction apparatus is configured such that the fixed member has an outer peripheral portion formed in the form of a framework, and the intermediate member is positioned on the inner periphery side of the outer peripheral portion of the fixed member.

In the image shake correction apparatus, since the intermediate member is positioned on the inner periphery side of the outer peripheral portion of the fixed member, the intermediate member and the fixed member are disposed in the same plane perpendicular to the direction of the optical axis.

Consequently, with the image shake correction apparatus, reduction in thickness of the image shake correction apparatus in the direction of the optical axis can be anticipated.

In this instance, preferably the image shake correction apparatus is configured such that the intermediate member is formed in the form of a framework, and the movable member is positioned on the inner periphery side of the intermediate member.

In the image shake correction apparatus, since the movable member is positioned on the inner periphery side of the intermediate member, the movable member and the intermediate member are disposed in the same plane perpendicular to the direction of the optical axis.

Accordingly, with the image shake correction apparatus, further reduction in thickness of the image shake correction apparatus in the direction of the optical axis can be anticipated.

Preferably, the image shake correction apparatus is configured such that the movement restraining section is formed integrally on the intermediate member and restrains the movement of the movable member in the one of the first and second directions.

In the image shake correction apparatus, since the movement restraining section is formed integrally on the intermediate member and restrains the movement of the movable member in the one of the first and second directions, the necessity for a movement restraining section separate from the intermediate member is eliminated.

Accordingly, with the image shake correction apparatus, reduction of the number of parts and simplification of the mechanism can be anticipated.

Preferably, the image shake correction apparatus is configured such that the intermediate member is formed in the form of a framework and has an inner peripheral face formed as the movement restraining section which restrains the movement of the movable member in the one of the first and second directions, and a plurality of restrained projections which function as the restrained section are provided on an outer peripheral face of the movable member so as to slidably move on the movement restraining section upon movement in the other of the first and second directions.

In the image shake correction apparatus, since the plurality of restrained projections which function as the restrained section are provided on the outer peripheral face of the movable member so as to slidably move on the movement restraining section, the restrained projections are slidably moved on the movement restraining section.

Accordingly, with the image shake correction apparatus, the structure is simple and reduction of the production cost can be anticipated.

Preferably, the image shake correction apparatus is configured such that a restraining projection which extends in the other of the first and second directions and functions as the movement restraining section which restrains the movement of the movable member in the one of the first and second directions is provided on the intermediate member, and a restrained groove which is supported for sliding movement on the restraining projection, extends in the other of the first and second directions and functions as the restrained section is formed on the movable member.

In the image shake correction apparatus, since the restrained groove which is supported for sliding movement on the restraining projection and functions as the restrained section is formed on the movable member, the retrained groove is slidably moved on the restraining projection.

Accordingly, with the image shake correction apparatus, the structure is simple and reduction of the production cost can be anticipated.

Preferably, the image shake correction apparatus is configured such that a restraining shaft is provided which extends in the other of the first and second directions and functions as the movement restraining section which restrains the movement of the movable member in the one of the first and second directions while a restrained bearing section which functions as the restrained section is provided on the movable member, and the restraining shaft is secured to the intermediate member and the restrained bearing section is supported for sliding movement on the restraining shaft or the restraining shaft is secured to the restrained bearing section and the intermediate member is supported for sliding movement on the restraining shaft.

In the image shake correction apparatus, since, the restrained bearing section which functions as the restrained section is provided on the movable member, the movement of the movable member in the one of the first and second directions with respect to the intermediate member is restrained by the restraining shaft.

Accordingly, with the image shake correction apparatus, since the intermediate member or the movable member is supported for sliding movement on the restraining shaft, a good sliding property of the intermediate member or the movable member is assured thereby to assure smooth movement of the intermediate member or the movable member.

Preferably, the image shake correction apparatus is configured such that the movement restraining section which restrains the movement of the intermediate member in the other of the first and second directions with respect to the fixed member is formed integrally on the fixed member.

In the image shake correction apparatus, since the movement restraining section which restrains the movement of the intermediate member in the other of the first and second directions with respect to the fixed member is formed integrally on the fixed member, the necessity for a movement restraining section separate from the fixed member is eliminated.

Accordingly, with the image shake correction apparatus, reduction in number of parts and simplification in mechanism can be anticipated.

Preferably, the image shake correction apparatus is configured such that the fixed member has an outer peripheral portion formed in the form of a framework and an inner peripheral face of the outer peripheral portion is formed as the movement restraining section which restrains the movement of the intermediate member in the other of the first and second directions with respect to the fixed member, and a plurality of restrained projections which function as the restrained section are provided on an outer peripheral face of the intermediate member so as to slidably move on the movement restraining section upon movement in the one of the first and second directions.

In the image shake correction apparatus, since the plurality of restrained projections are provided on the outer peripheral face of the intermediate member so as to slidably move on the movement restraining section, the restrained projections are slidably moved on the movement restraining section.

Accordingly, with the image shake correction apparatus, the structure is simple and reduction of the production cost can be anticipated.

Preferably, the image shake correction apparatus is configured such that the fixed member has a receiving portion, and the intermediate member has a position restraining projection provided thereon and projecting in the direction of the optical axis so as to be capable of contacting with the projection in the direction of the optical axis.

In the image shake correction apparatus, since the intermediate member has the position restraining projection provided thereon and projecting in the direction of the optical axis so as to be capable of contacting with the receiving portion in the direction of the optical axis, the movement of the intermediate member in the direction of the optical axis is restrained.

Accordingly, with the image shake correction apparatus, play of the intermediate member in the direction of the optical axis with respect to the fixed member can be prevented without relying upon the pair of guide shafts.

Preferably, the image shake correction apparatus is configured such that the intermediate member has a position restraining projection provided thereon and projecting in the direction of the optical axis so as to be capable of contacting with a holding tube, which holds the fixed member thereon, in the direction of the optical axis.

In the image shake correction apparatus, since the intermediate member has the position restraining projection provided thereon and projecting in the direction of the optical axis so as to be capable of contacting with the holding tube in the direction of the optical axis, the movement of the intermediate member in the direction of the optical axis is restrained.

Accordingly, with the image shake correction apparatus, play of the intermediate member in the direction of the optical axis with respect to the fixed member can be prevented without relying upon the pair of guide shafts.

Preferably, the image shake correction apparatus is configured such that the other of the first and second directions is the direction of the gravity.

In the image shake correction apparatus, since the other of the first and second directions is the direction of the gravity, the direction of the movement of the movable member with respect to the fixed member coincides with the direction of the gravity.

Accordingly, with the image shake correction apparatus, the holding force corresponding to the gravity is required only for the movable member which does not include the intermediate member. Consequently, the power consumption can be reduced and improvement of the performance for shake correction can be anticipated as much.

According to another embodiment of the present invention, there is provided an image pickup apparatus including an image shake correction apparatus for moving an lens or an image pickup device in a direction perpendicular to a direction of an optical axis to correct image shake, the image shake correction apparatus including a fixed member fixed in three directions including the direction of the optical axis, a first direction perpendicular to the direction of the optical axis, and a second direction perpendicular to both of the direction of the optical axis and the first direction, a pair of guide shafts supported on the fixed member so as to extend in the first direction and disposed in a spaced relationship from each other in the second direction, an intermediate member supported on the pair of guide shafts for movement in one of the first and second directions but against movement in the other of the first and second directions with respect to the fixed member, a movable member having a lens or an image pickup device held thereon and supported on the pair of guide shafts for movement in the first and second directions with respect to the fixed member and for movement in the other of the first and second directions but against movement in the one of the first and second directions with respect to the intermediate member, a movement restraining section to restrain the movement of the movable member in the one of the first and second directions with respect to the intermediate member or restrain the movement of the intermediate member in the other of the first and second directions with respect to the fixed member, and a restrained section provided on the movable member or the intermediate member for being engaged at least at two locations thereof by the movement restraining section in the second direction, the intermediate member and the movable member being moved integrally with each other in the one of the first and second directions with respect to the fixed member while the movable member is moved in the other of the first and second directions with respect to the fixed member to carry out correction of image shake.

In the image pickup apparatus, the movable member is supported on the pair of guide shafts extending in the first direction and disposed in a spaced relationship from each other in the second direction. In this state, the movement of the movable member with respect to the intermediate member or the movement of the intermediate member with respect to the fixed member is restrained.

Accordingly, with the image pickup apparatus, rotation of the movable member in a plane perpendicular to the direction of the optical axis upon movement of the movable member in the first direction and the second direction is prevented, and smooth movement of the movable member in the first direction and the second direction can be assured.

Preferably, the image pickup apparatus is configured such that the other of the first and second directions is the direction of the gravity.

In the image pickup apparatus, since the other of the first and second directions is the direction of the gravity, the direction of the movement of the movable member with respect to the fixed member coincides with the direction of the gravity.

Accordingly, with the image pickup apparatus, the holding force corresponding to the gravity is required only for the movable member which does not include the intermediate member. Consequently, the power consumption can be reduced and improvement of the performance for shake correction can be anticipated as much.

The above and other features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

In the following, preferred embodiments of the present invention are described in detail with reference to the accompanying drawings.

In the embodiments described below, the image pickup apparatus of the present invention is applied to a video camera, and the image shake correction apparatus of the present invention is applied to an image shake correction apparatus provided in the video camera.

It is to be noted that the application range of the image pickup apparatus and the image shake correction apparatus of the present invention is not limited to the video camera and the image shake correction apparatus provided in the video camera, respectively. The image pickup apparatus and the image shake correction apparatus of the present invention can be applied widely to image pickup apparatus incorporated in various apparatus such as, for example, a still camera, a portable telephone set and a PDA (Personal Digital Assistant) or image shake correction apparatus provided in such image pickup apparatus.

It is to be noted that forward, backward, upward, downward, leftward and rightward directions in the following description are those as viewed from an image pickup person upon image pickup of the video camera. Accordingly, the image pickup object side corresponds to the forward direction, and the image pickup person side corresponds to the backward direction.

It is to be noted that the forward, backward, upward, downward, leftward and rightward directions described below are naturally used for the convenience of description, and in embodying the present invention, actual directions are not limited to the specific directions.

Further, the term "lens" used hereinbelow is used to represent a concept which includes both of a lens system which is composed of a single lens and another lens system which is composed of a plurality of lenses as a lens group.

First, the image shake correction apparatus is described.

First Embodiment

In the following, the image pickup correction apparatus according to a first embodiment of the present invention is described with reference to FIGS. 1 to 9.

Figure 1:
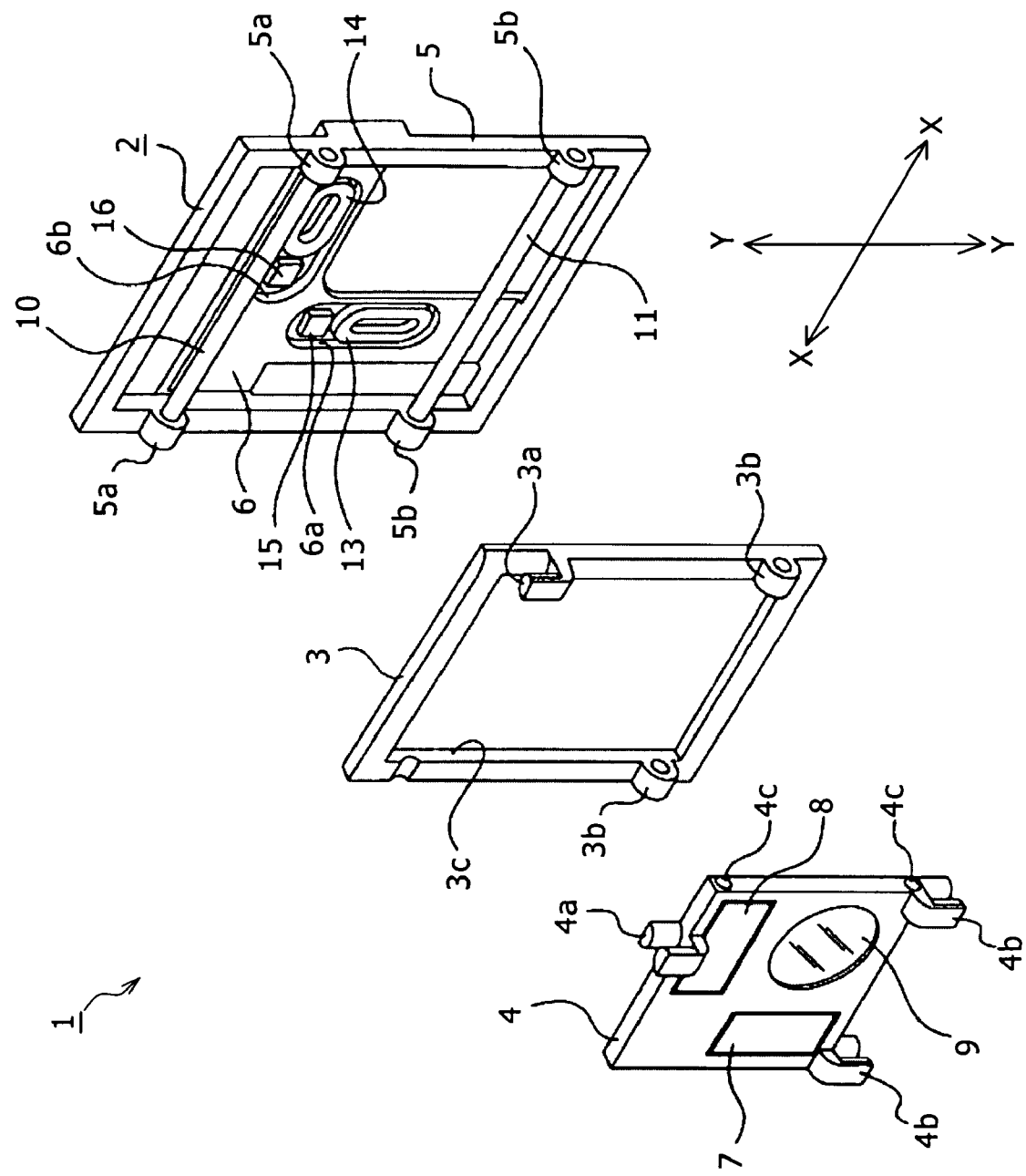
FIG. 1 is an exploded perspective view showing an image shake correction apparatus according to a first embodiment of the present invention.
Figure 2:
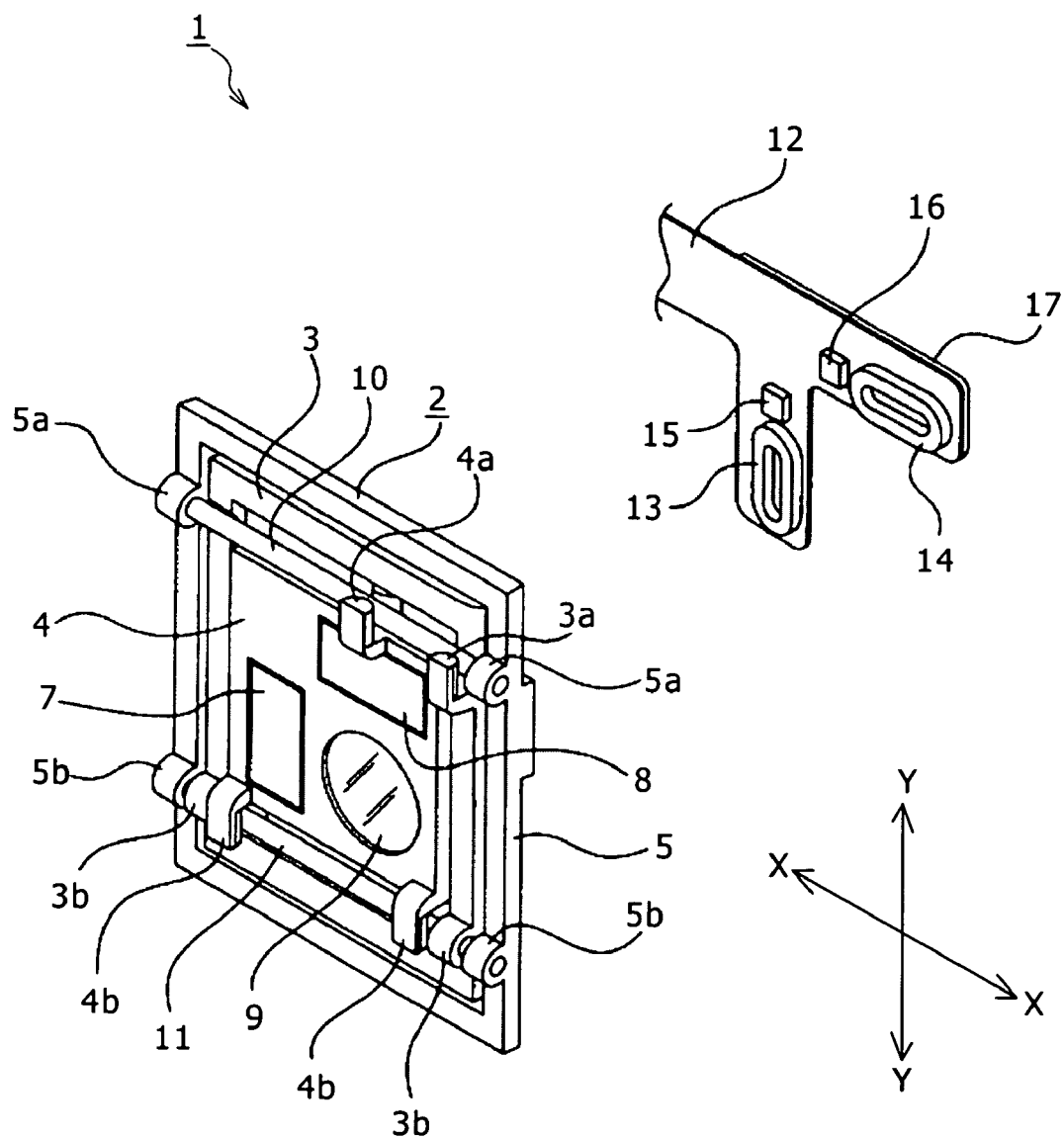
FIG. 2 is a perspective view showing the image shake correction apparatus with a flexible printed wiring board removed.
Figure 3:
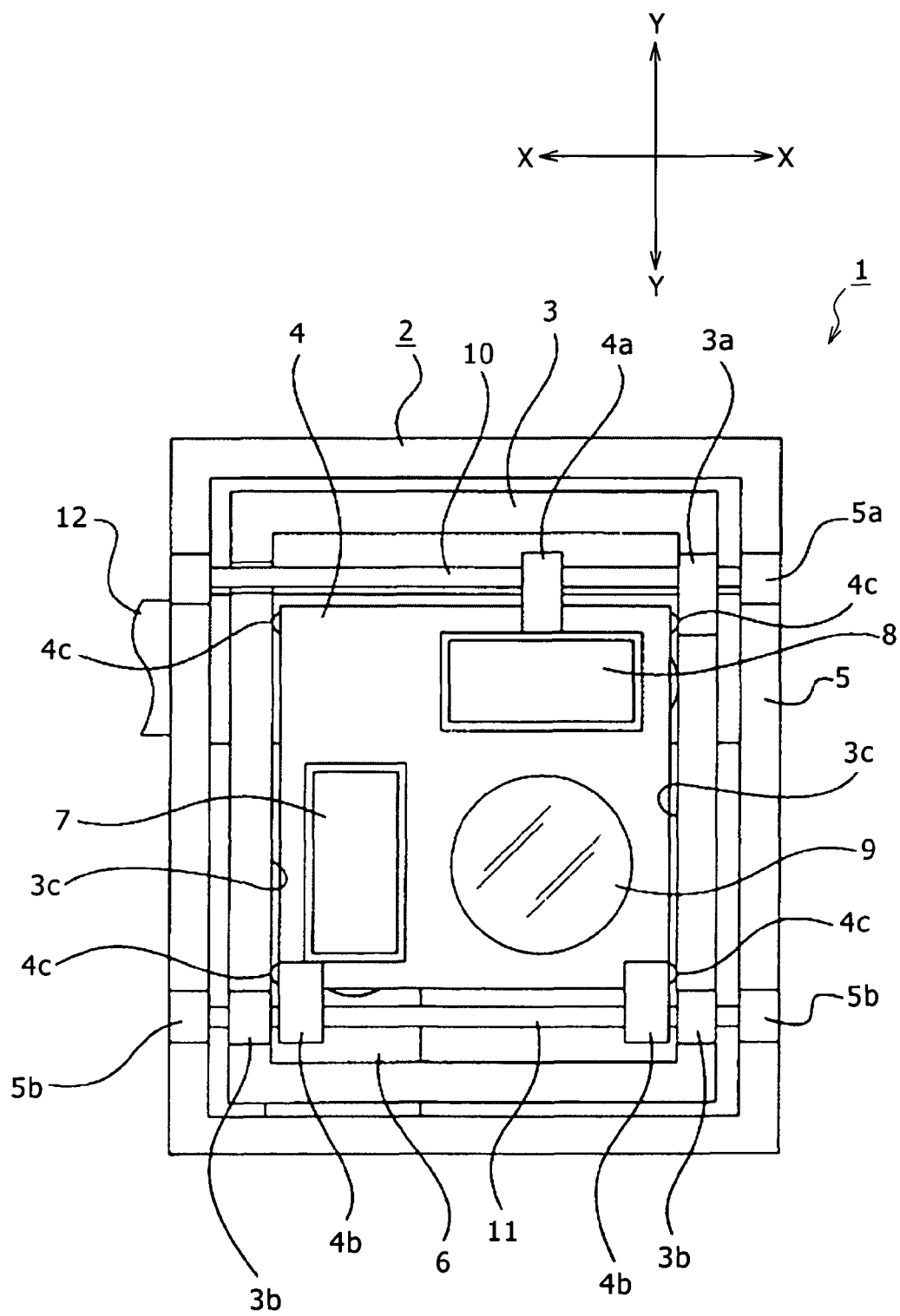
FIG. 3 is an enlarged front elevational view of the image shake correction apparatus.

Referring first to FIGS. 1 to 3, the image shake correction apparatus 1 includes a fixed member 2, an intermediate member 3 and a movable member 4.

The fixed member 2 includes a framework-like portion 5 formed like a rectangular framework and an attaching face portion 6 provided on the inner side of the framework-like portion 5. The fixed member 2 is secured, for example, to a holding tube not shown provided as an external housing for a lens barrel.

A pair of first round bearing sections 5a are provided in a leftwardly and rightwardly spaced relationship from each other at positions of the framework-like portion 5 of the fixed member 2 rather near to an upper end and project forwardly. A circular bearing hole is formed leftwardly and rightwardly through each of the first round bearing sections 5a. A pair of second round bearing sections 5b are provided in a spaced relationship from each other at positions of the framework-like portion 5 of the fixed member 2 rather near to a lower end and project forwardly. A circular bearing hole is formed leftwardly and rightwardly through each of the second round bearing sections 5b.

The attaching face portion 6 of the fixed member 2 is provided such that it connects the rear face of the framework-like portion 5, and a vertically elongated first disposition hole 6a and a horizontally elongated second disposition hole 6b are formed on the attaching face portion 6.

The intermediate member 3 is formed as a rectangular framework one size smaller than the framework-like portion 5 of the fixed member 2.

A channel-shaped bearing section 3a is provided at a position of a left end portion of the intermediate member 3 rather near to an upper end and projects forwardly such that it is open upwardly. A pair of round bearing sections 3b are provided in a leftwardly and rightwardly spaced relationship from each other at positions of the intermediate member 3 rather near to a lower end and project forwardly. A circular bearing hole is formed leftwardly and rightwardly through each of the round bearing sections 3b.

Portions of an inner peripheral face of the intermediate member 3 which are positioned on the left and right are formed as movement restraining sections 3c.

The movable member 4 is formed as a rectangular plate and has an outer shape smaller than the inner shape of the intermediate member 3.

A vertically elongated first driving magnet 7 and a horizontally elongated second driving magnet 8 are attached in an embedded state to the movable member 4. A lens 9 is held on the movable member 4 and functions as a lens for correction. It is to be noted that the lens 9 may be replaced by an image pickup device such as a CCD (Charge Coupled Device) device or a CMOS (Complementary Metal Oxide Semiconductor) device.

A first channel-shaped bearing section 4a is provided at an upper end portion of the movable member 4 and is open upwardly. A pair of second channel-shaped bearing sections 4b are provided in a leftwardly and rightwardly spaced relationship from each other at lower end portions of the movable member 4 and are open downwardly.

A plurality of restrained projections 4c are provided at the opposite upper and lower end portions of the opposite left and right side faces of the movable member 4 and project outwardly. The restrained projections 4c function as restrained portions and are each formed as a moderately curved face which is convex in the outward direction.

A guide shaft 10 is fixedly attached to the fixed member 2 and extends in the leftward and rightward direction, which is a first direction and an X-X direction shown in several figures, between the first round bearing sections 5a. Another guide shaft 11 is fixedly attached to the fixed member 2 and extends in the leftward and rightward direction between the second round bearing sections 5b.

A flexible printed wiring board 12 is attached to a rear face of the attaching face portion 6 of the fixed member 2, and a vertically elongated first driving coil 13 and a horizontally elongated second driving coil 14 are attached to the front face of the flexible printed wiring board 12. A first detection element 15 and a second detection element 16 are attached to positions of the front face of the flexible printed wiring board 12 which are adjacent the first driving coil 13 and the second driving coil 14, respectively. For example, a Hall device is used for the first detection element 15 and the second detection element 16. A reinforcing plate 17 is attached to the rear face of the flexible printed wiring board 12.

In a state wherein the flexible printed wiring board 12 is attached to the rear face of the attaching face portion 6, the first driving coil 13 and the first detection element 15 are inserted and disposed in the first disposition hole 6a and the second driving coil 14 and the second detection element 16 are inserted and disposed in the second disposition hole 6b.

The intermediate member 3 is supported at the channel-shaped bearing section 3a thereof for sliding movement on the guide shaft 10 and at the round bearing sections 3b thereof for sliding movement on the guide shaft 11 and is disposed on the inner periphery side of the framework-like portion 5 of the fixed member 2. Accordingly, the intermediate member 3 is movable in the first direction, that is, in the leftward and rightward direction, on the inner periphery side of the framework-like portion 5 with respect to the fixed member 2 through the guide shafts 10 and 11.

The movable member 4 is supported at the first channel-shaped bearing section 4a thereof for sliding movement on the guide shaft 10 and at the second channel-shaped bearing sections 4b thereof for sliding movement on the guide shaft 11 and is disposed on the inner periphery side of the intermediate member 3.

In a state wherein the movable member 4 is supported on the guide shafts 10 and 11, the first driving magnet 7 is positioned in an opposing relationship to and forwardly of the first driving coil 13 and the first detection element 15, and the second driving magnet 8 is positioned in an opposing relationship to and forwardly of the second driving coil 14 and the second detection element 16.

In the state wherein the movable member 4 is supported on the guide shafts 10 and 11, the restrained projections 4c of the movable member 4 are positioned in the proximity of or contact with the movement restraining sections 3c of the intermediate member 3 such that the movable member 4 can slidably move. Accordingly, although the movable member 4 is restrained from movement in the first direction with respect to the intermediate member 3 by the movement restraining sections 3c, upon movement of the intermediate member 3 in the first direction with respect to the fixed member 2, the movable member 4 is moved in the first direction integrally with the intermediate member 3 with respect to the fixed member 2.

The first channel-shaped bearing section 4a and the second channel-shaped bearing sections 4b of the movable member 4 are slidably moved on the guide shafts 10 and 11 such that the movable member 4 is movable in the upward and downward direction, that is, in the second direction which is a Y-Y direction in the pertaining figures with respect to the fixed member 2 and the intermediate member 3.

In the image shake correction apparatus 1 having such a configuration as described above, if current is supplied to the first driving coil 13, then leftward or rightward thrust is applied to the movable member 4 in response to the direction of the supplied current in a relation to the first driving magnet 7. Consequently, the intermediate member 3 and the movable member 4 are moved integrally with each other in the first direction with respect to the fixed member 2. On the other hand, if current is supplied to the second driving coil 14, then upward or downward thrust is applied to the movable member 4 in response to the direction of the supplied current in a relation to the second driving magnet 8. Consequently, the movable member 4 is moved in the second direction with respect to the intermediate member 3 and the fixed member 2.

As the movable member 4 which holds the lens 9 or the image pickup apparatus is moved in the first direction and the second direction as described above, image shake is corrected. At this time, the position of the movable member 4 with respect to the fixed member 2 is detected at any time by the first detection element 15 and the second detection element 16, and appropriate operation of the movable member 4 is achieved.

It is to be noted that, while, in the example described above, the channel-shaped bearing section 3a is provided on the intermediate member 3 and the first channel-shaped bearing section 4a and the second channel-shaped bearing sections 4b are provided on the movable member 4, it is possible to replace each of the channel-shaped bearing sections 3a, 4a and 4b with a bearing section having an upwardly and downwardly elongated hole.

As described above, in the image shake correction apparatus 1, since the movement restraining sections 3c are formed integrally on the intermediate member 3, reduction in number of parts and simplification in mechanism can be anticipated.

Further, in the image shake correction apparatus 1, since the intermediate member 3 is formed in a framework shape and the inner face of the intermediate member 3 is formed as the movement restraining sections 3c while the restrained projections 4c are provided on the outer peripheral face of the movable member 4, the structure is simple and reduction of the production cost can be anticipated.

Furthermore, in the image shake correction apparatus 1, since the intermediate member 3 and the movable member 4 are supported on the guide shafts 10 and 11 both supported on the fixed member 2, the accuracy in position of the movable member 4 in the direction of the optical axis and the accuracy in gradient of the movable member 4 with respect to the optical axis depend upon the accuracy in position of the guide shafts 10 and 11 but do not rely upon the accuracy in position and the accuracy in gradient of the intermediate member 3 with respect to the fixed member 2. Accordingly, since the accuracy in position of the lens 9 or the image pickup apparatus held on the movable member 4 does not rely upon the accuracy in position and the accuracy in gradient of the intermediate member 3, improvement in accuracy of the operation position in shake correction can be anticipated.

It is to be noted that, while, in the example described above, the movement restraining sections 3c in the form of a flat face are formed on the intermediate member 3 and the restrained projections 4c in the form of a projection are formed on the movable member 4, it is otherwise possible to conversely form the movement restraining sections 3c as projections and form the restrained projections 4c as flat faces.

Figure 4:
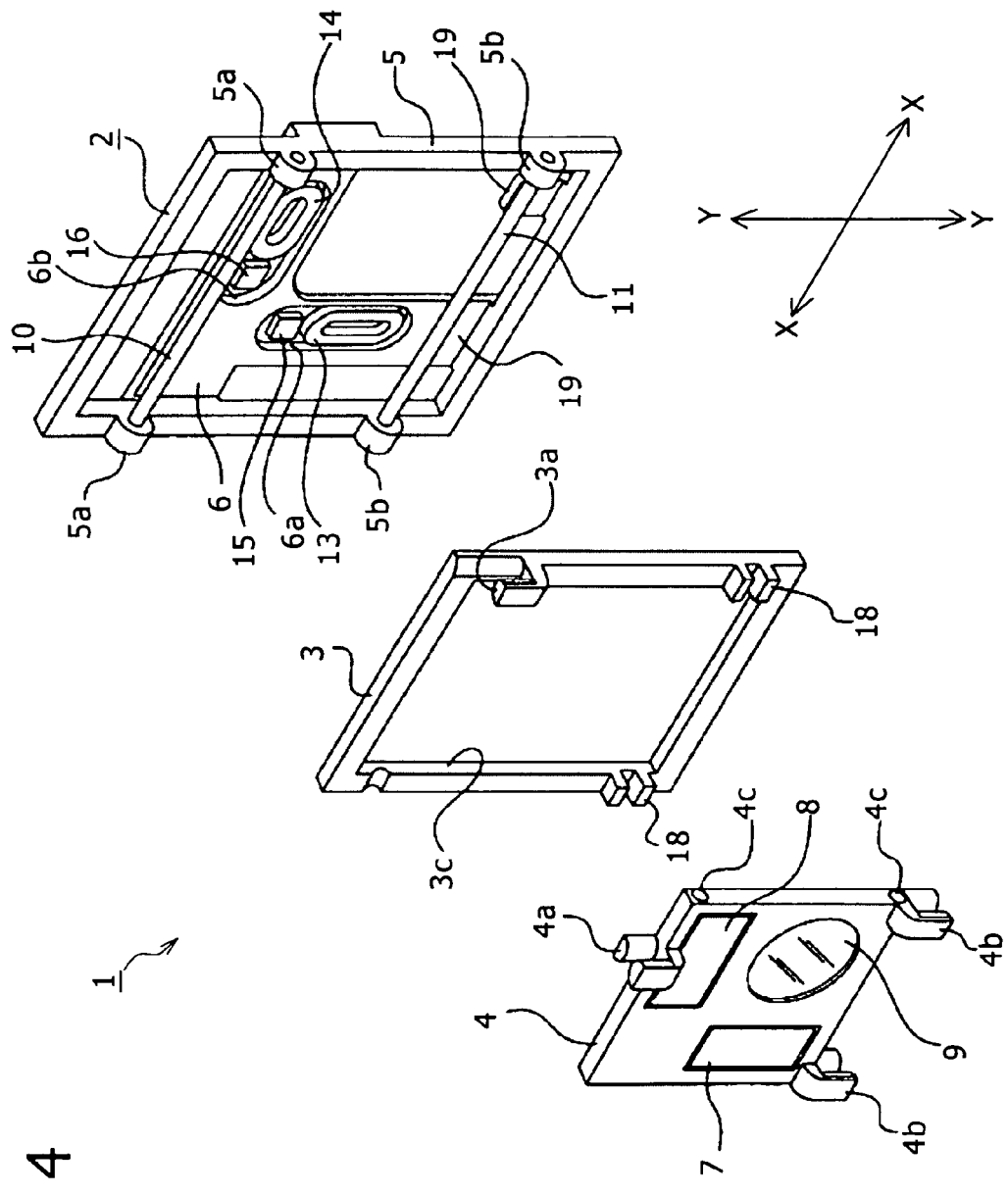
FIG. 4 is an exploded perspective view showing the image shake correction apparatus which uses a bearing section having a changed shape.
Figure 5:
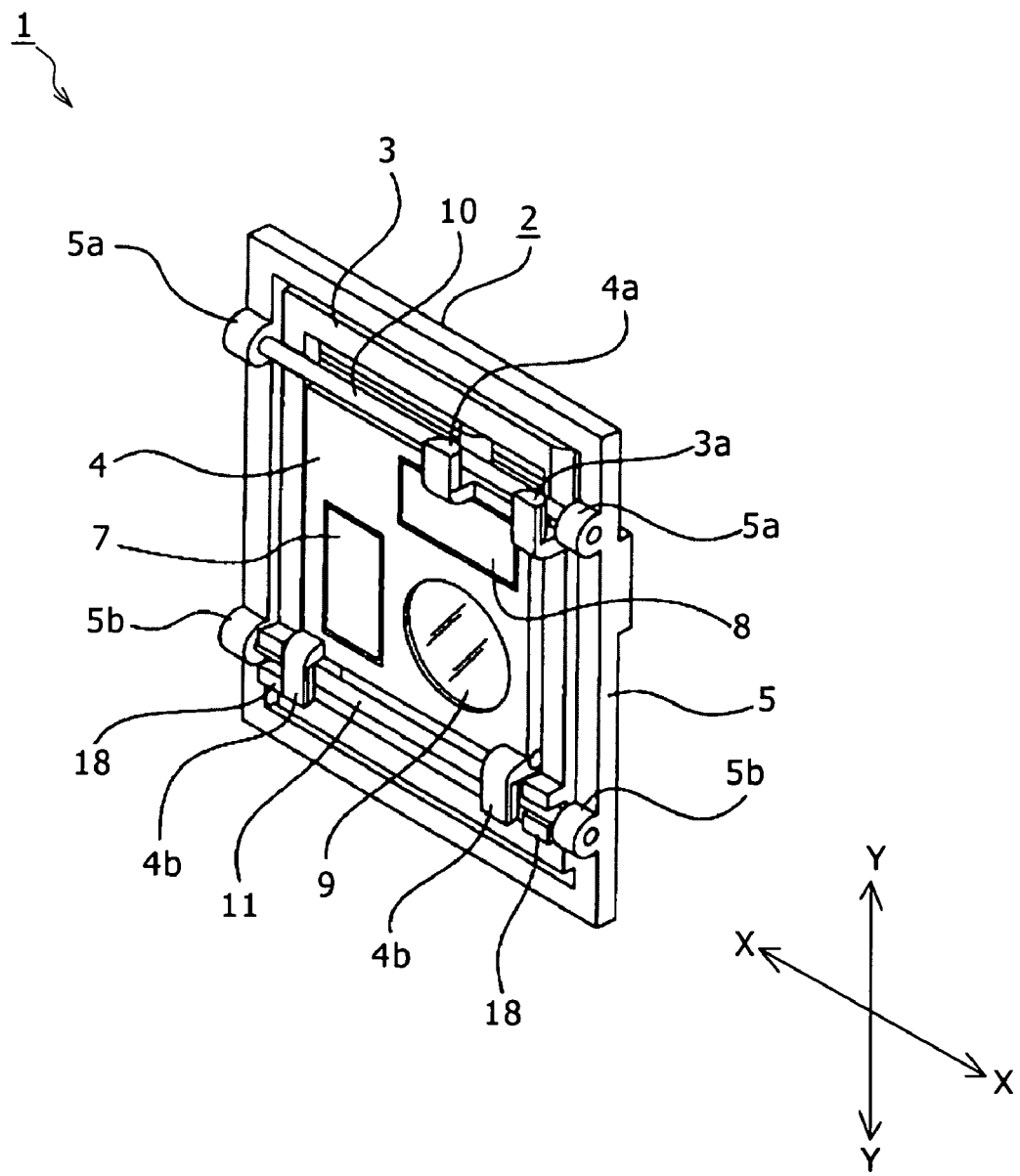
FIG. 5 is a perspective view showing the image shake correction apparatus shown in FIG. 4 with the flexible printed wiring board removed.

While, in the example described above, the round bearing sections 3b are provided at positions of the intermediate member 3 rather near to the lower end and are supported on the guide shaft 11, the round bearing sections 3b may be replaced by channel-shaped bearing sections 18 which are open forwardly as shown in FIGS. 4 and 5.

Figure 6:
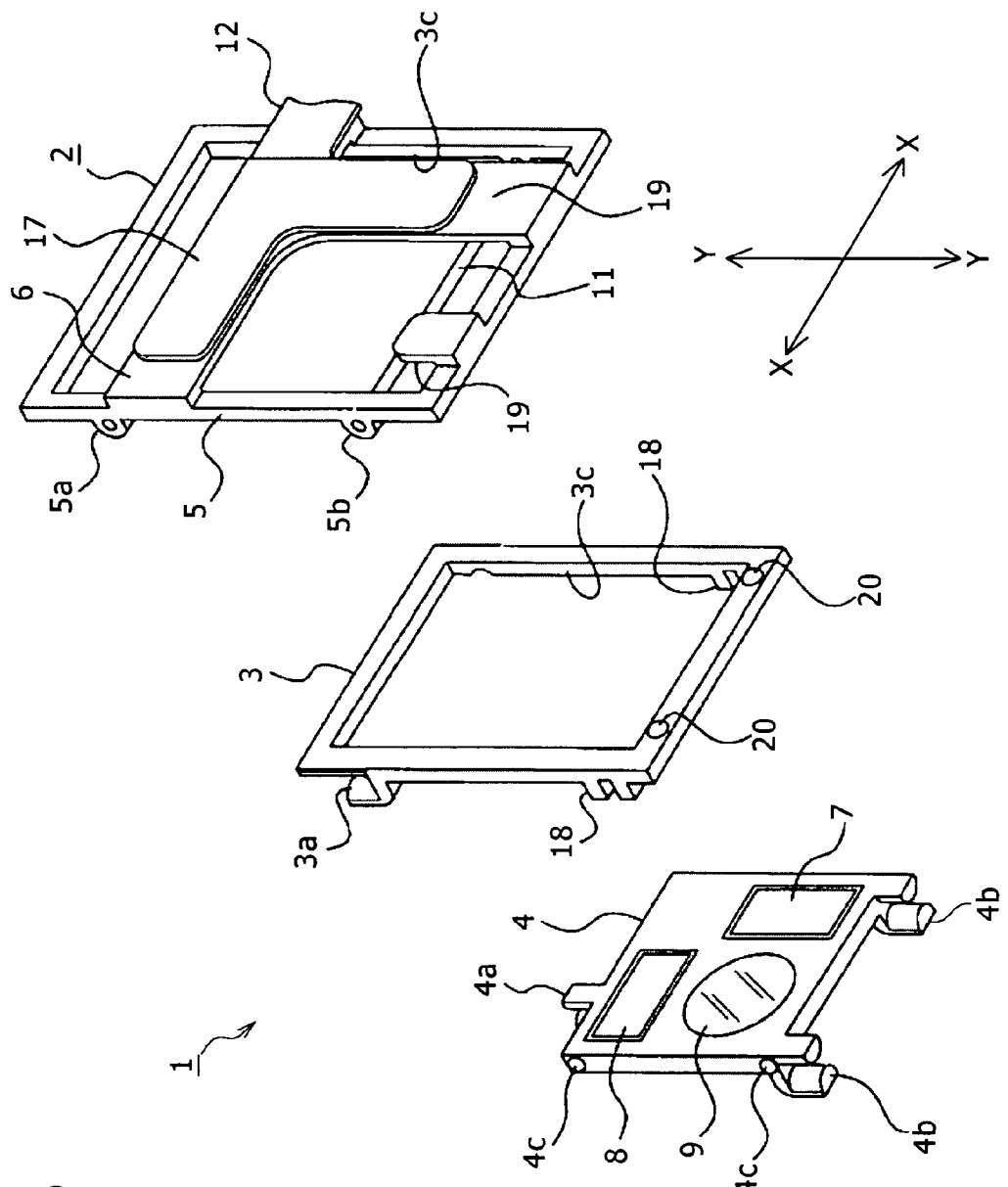
FIG. 6 is an exploded perspective view showing the image shake correction apparatus of FIG. 4 as viewed from the opposite side to that of FIG. 4.

In this instance, preferably receiving portions 19 are provided at a lower end portion of the fixed member 2 and rearwardly projecting position restraining projections 20 are provided at positions of a lower end portion of the intermediate member 3 opposing to the receiving portions 19 such that they can contact with the receiving portions 19 in a state wherein the bearing sections 18 of the intermediate member 3 are supported on the guide shaft 11 as shown in FIGS. 4 and 6. The position restraining projections 20 have an outer face formed as a moderately curved face. It is to be noted that part of the attaching face portion 6 is used as one of the receiving portions 19.

Where the receiving portions 19 are provided on the fixed member 2 and the position restraining projections 20 are provided on the intermediate member 3 in this manner, even where the channel-shaped bearing sections 18 are provided such that the intermediate member 3 can move rearwardly with respect to the fixed member 2, the position restraining projections 20 are contacted with the receiving portions 19. Consequently, play of the intermediate member 3 in the direction of the optical axis with respect to the fixed member 2 can be prevented without relying upon the pair of guide shafts 10 and 11.

Figure 7:
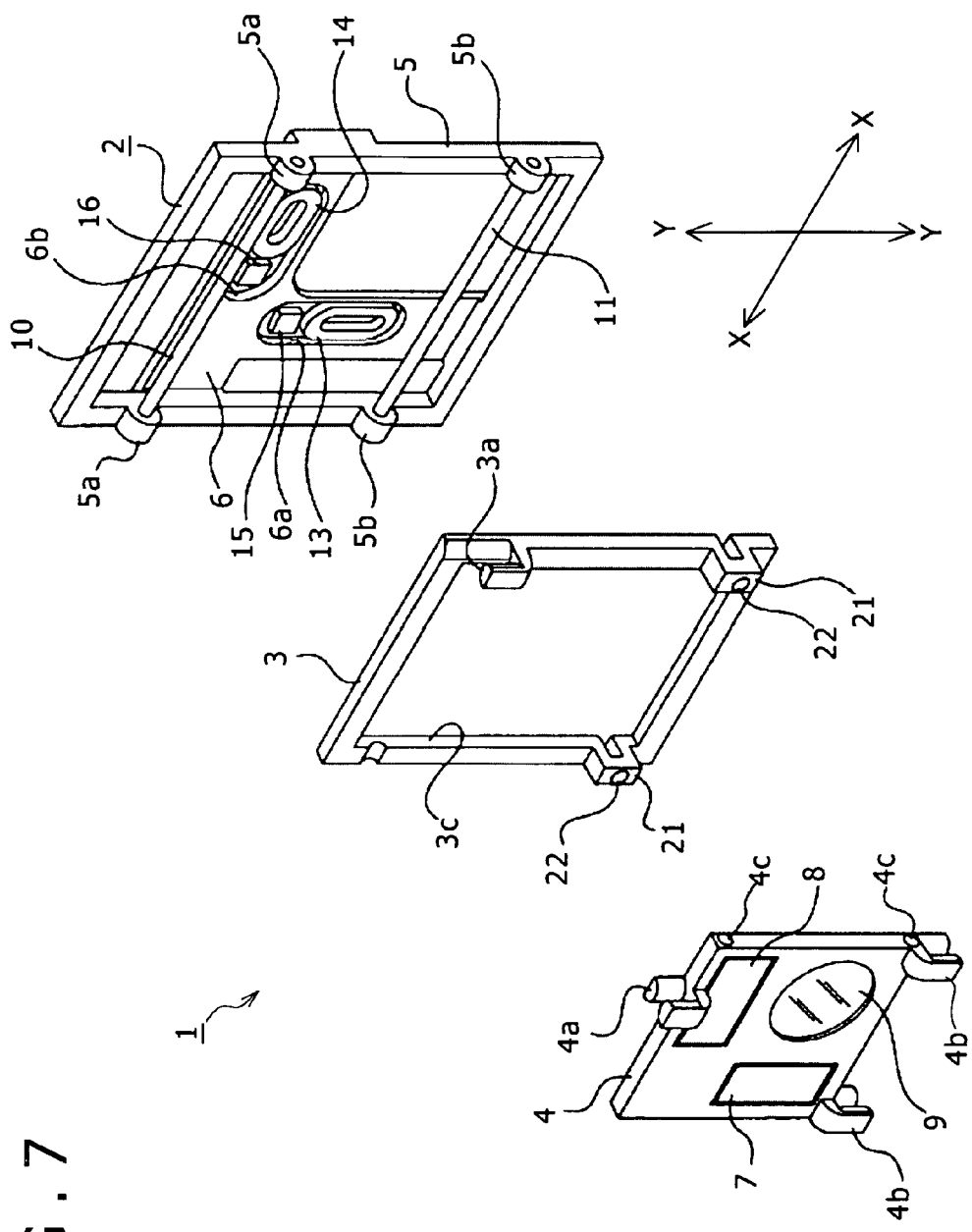
FIG. 7 is an exploded perspective view showing the image shake correction apparatus which uses a bearing section having another changed shape.
Figure 8:
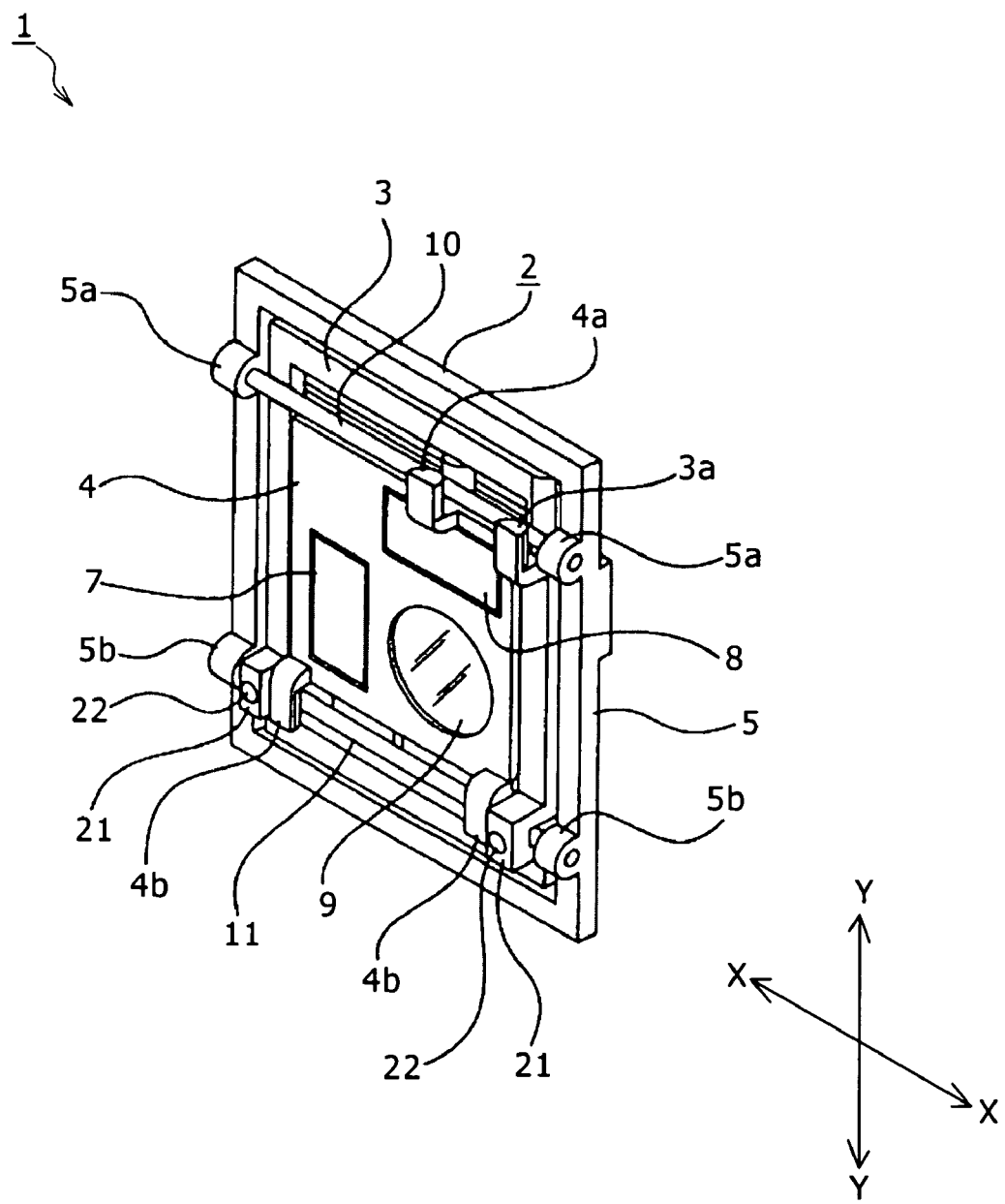
FIG. 8 is a perspective view showing the image shake correction apparatus of FIG. 7 with the flexible printed wiring board removed.

The round bearing sections 3b provided at positions of the intermediate member 3 rather near to the lower end may be replaced by channel-shaped bearing sections 21 which are open rearwardly as shown in FIGS. 7 and 8.

Figure 9:
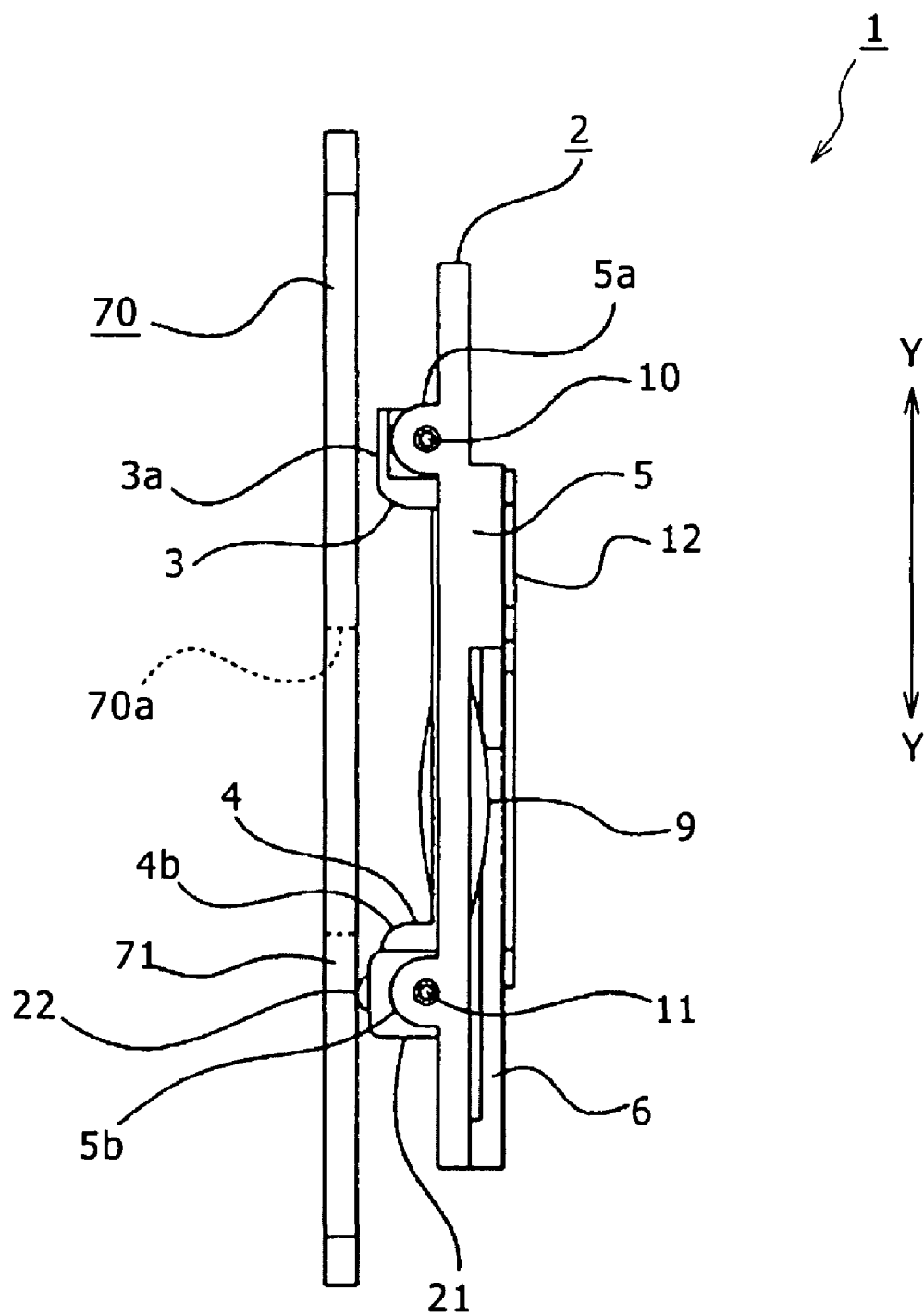
FIG. 9 is an enlarged side elevational view showing the image shake correction apparatus which uses a bearing section having a further changed shape together with a holding tube.

In this instance, preferably part of a holding tube 70 provided as an outer housing of the lens barrel is provided as a receiving portion 71 and position restraining projections 22 which can contact with the receiving portion 71 are provided on the front face of the channel-shaped bearing sections 21 of the intermediate member 3 as shown in FIG. 9. The position restraining projections 22 have an outer face formed as a moderately curved face. A perforation 70a for passing light therethrough to the lens 9 is formed in the holding tube 70.

Since part of the holding tube 70 is provided as the receiving portion 71 and the position restraining projections 22 are provided on the channel-shaped bearing sections 21 of the intermediate member 3 in this manner, even where the channel-shaped bearing sections 21 are provided such that the intermediate member 3 can move forwardly with respect to the fixed member 2, the position restraining projections 22 are contacted with the receiving portion 71. Consequently, play of the intermediate member 3 in the direction of the optical axis with respect to the fixed member 2 can be prevented without relying upon the pair of guide shafts 10 and 11.

<Modifications>

Now, modifications to the image shake correction apparatus according to the first embodiment are described with reference to FIGS. 10 to 15.

It is to be noted that the modifications described below, that is, an image shake correction apparatus 1A of a first modification, an image shake correction apparatus 1B of a second modification and an image shake correction apparatus 1C of a third modification are different only in the supporting state of the fixed member, intermediate member and movable member with respect to the guide shafts in comparison with the image shake correction apparatus 1 described hereinabove, respectively. Accordingly, in the following description of the modifications, only differences from the image shake correction apparatus 1 are described in detail while description of the common portions is omitted herein to avoid redundancy.

<First Modification>

Figure 10:
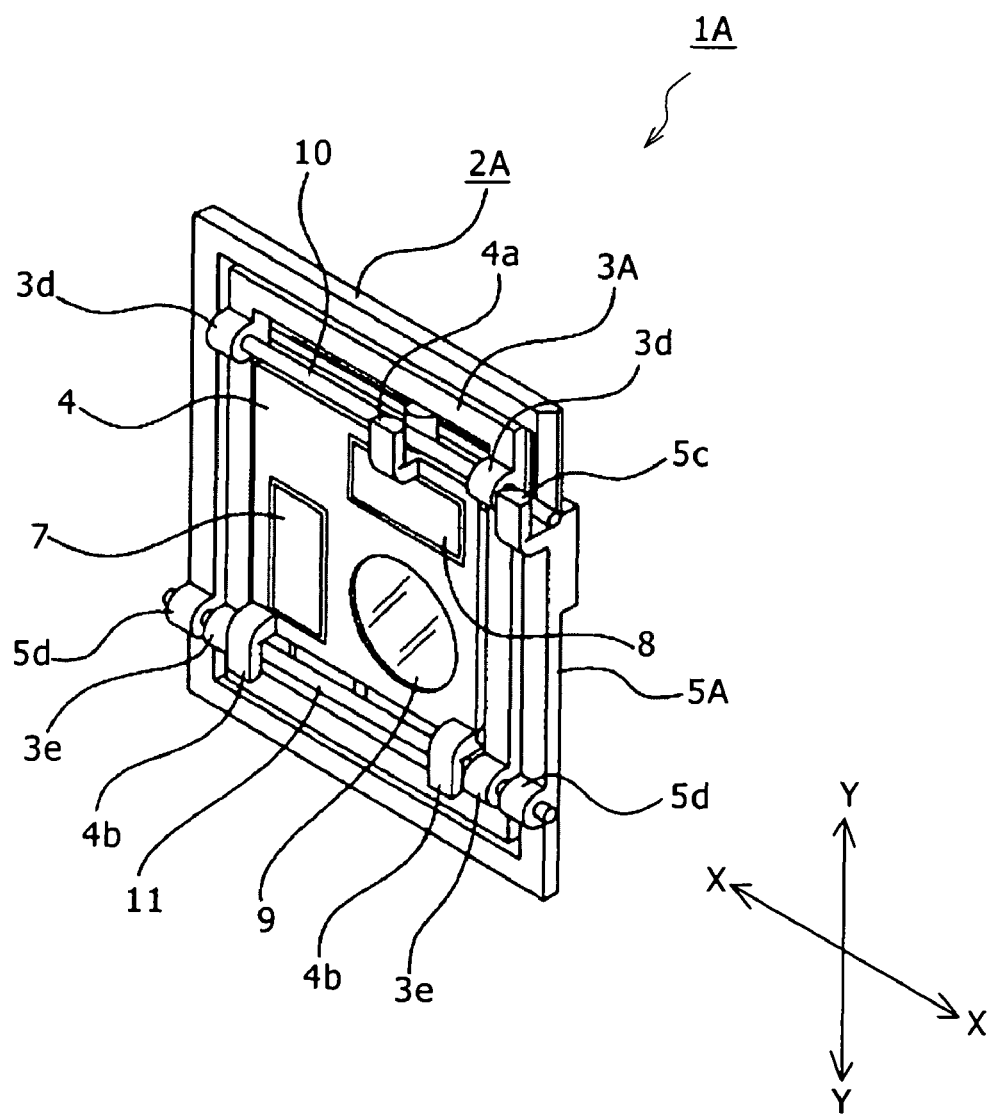
FIG. 10 is a perspective view showing a first modification to the image shake correction apparatus.
Figure 11:
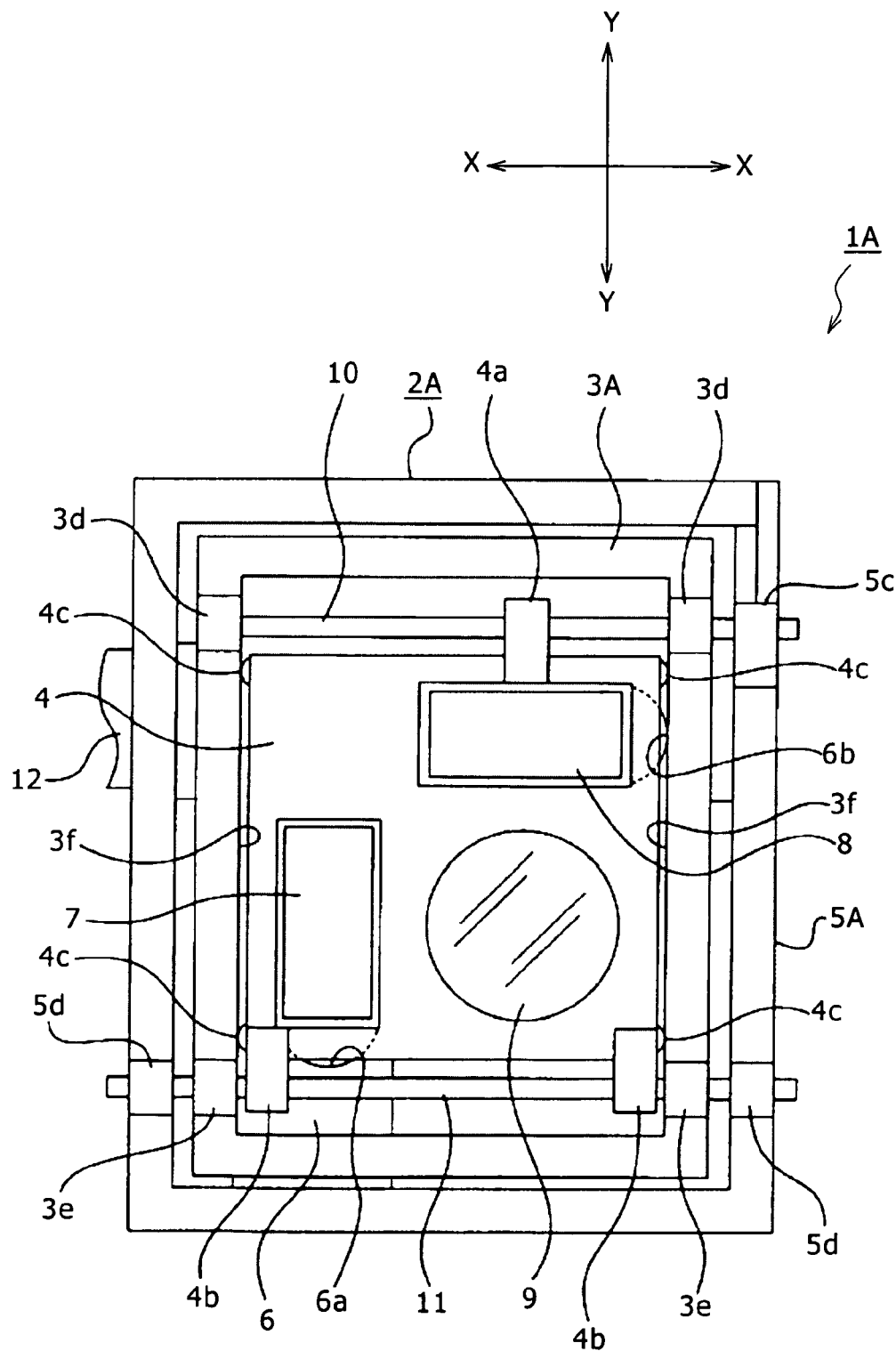
FIG. 11 is an enlarged front elevational view showing the modified image shake correction apparatus of FIG. 10.

First, the image shake correction apparatus 1A according to the first modification is described with reference to FIGS. 10 and 11.

The image shake correction apparatus 1A has a fixed member 2A, an intermediate member 3A and a movable member 4.

The fixed member 2A includes a framework-like portion 5A formed as a rectangular framework, and an attaching face portion 6 provided on the inner side of the framework-like portion 5A.

A channel-shaped bearing section 5c is provided at a position of a left end portion of the framework-like portion 5A of the fixed member 2A rather near to an upper end such that it projects forwardly and is open upwardly. A pair of round bearing sections 5d are provided in a leftwardly and rightwardly spaced relationship from each other at positions of the framework-like portion 5A of the fixed member 2A rather near to a lower end such that they project forwardly. A circular bearing hole is formed leftwardly and rightwardly through each of the round bearing sections 5d.

The intermediate member 3A is formed as a rectangular framework one size smaller than the framework-like portion 5A of the fixed member 2A.

A pair of first round bearing sections 3d are formed in a leftwardly and rightwardly spaced relationship from each other at positions of the intermediate member 3A rather near to an upper end and project forwardly. A circular bearing hole is formed leftwardly and rightwardly through each of the first round bearing sections 3d. A pair of second round bearing sections 3e are provided in a leftwardly and rightwardly spaced relationship from each other at positions of the intermediate member 3A rather near to a lower end and project forwardly. A circular bearing hole is formed leftwardly and rightwardly through each of the second round bearing sections 3e.

Portions of an inner peripheral face of the intermediate member 3A which are positioned on the left and right are formed as movement restraining sections 3f.

A guide shaft 10 is supported for sliding movement on the channel-shaped bearing section 5c of the fixed member 2A and extends in the first direction. Meanwhile, a guide shaft 11 is supported for sliding movement on and extends between the round bearing sections 5d.

A flexible printed wiring board 12 is attached to a rear portion of the attaching face portion 6 of the fixed member 2A.

The intermediate member 3A is disposed on the inner periphery side of the framework-like portion 5A of the fixed member 2A with the guide shaft 10 thereof fixedly attached to and between the first round bearing sections 3d and with the guide shaft 11 fixedly attached to and between the second round bearing sections 3e. Accordingly, the intermediate member 3A is movable in the first direction integrally with the guide shafts 10 and 11 on the inner periphery side of the framework-like portion 5A with respect to the fixed member 2A.

In the image shake correction apparatus 1A configured in such a manner as described above, if current is supplied to the first driving coil 13, then leftward or rightward thrust is applied to the movable member 4 in response to the direction of the supplied current in a relation to the first driving magnet 7. Consequently, the intermediate member 3A and the movable member 4 are moved integrally with each other in the first direction with respect to the fixed member 2A. On the other hand, if current is supplied to the second driving coil 14, then upward or downward thrust is applied to the movable member 4 in response to the direction of the supplied current in a relation to the second driving magnet 8. Consequently, the movable member 4 is moved in the second direction with respect to the intermediate member 3A and the fixed member 2A.

As the movable member 4 which holds the lens 9 or the image pickup apparatus is moved in the first direction and the second direction as described above, image shake is corrected.

It is to be noted that, while, in the example described above, the channel-shaped bearing section 5c is provided on the fixed member 2A, it is also possible to replace the framework-like portion 5 with a bearing section having an upwardly and downwardly elongated hole.

As described above, in the image shake correction apparatus 1A, since the movement restraining sections 3f are formed integrally on the intermediate member 3A, reduction in number of parts and simplification in mechanism can be anticipated.

Further, since, in the image shake correction apparatus 1A, the intermediate member 3A is formed as a framework and the inner peripheral face of the intermediate member 3A is formed as the movement restraining sections 3f while the restrained projections 4c are provided on the outer peripheral face of the movable member 4, the structure is simple and reduction of the production cost can be anticipated.

Further, in the image shake correction apparatus 1A, since both of the intermediate member 3A and the movable member 4 are supported on the guide shafts 10 and 11 supported on the fixed member 2A, the accuracy in position of the movable member 4 in the direction of the optical axis and the accuracy in gradient of the movable member 4 with respect to the optical axis rely upon the accuracy in position of the guide shafts 10 and 11 but do not rely upon the accuracy in position and the accuracy in gradient of the intermediate member 3A with respect to the fixed member 2A. Accordingly, the accuracy in position and the accuracy in gradient of the lens 9 or the image pickup apparatus held on the movable member 4 do not rely upon the accuracy in position of the intermediate member 3A. Therefore, improvement of the accuracy in operation position in shake correction can be anticipated.

It is to be noted that, while, in the example described above, the movement restraining sections 3f in the form of a flat plate are formed on the intermediate member 3A and the restrained projections 4c in the form of a projection are provided on the movable member 4, also it is possible to form movement restraining sections in the form of a projection and form restrained projections as a flat face conversely.

<Second Modification>

Figure 12:
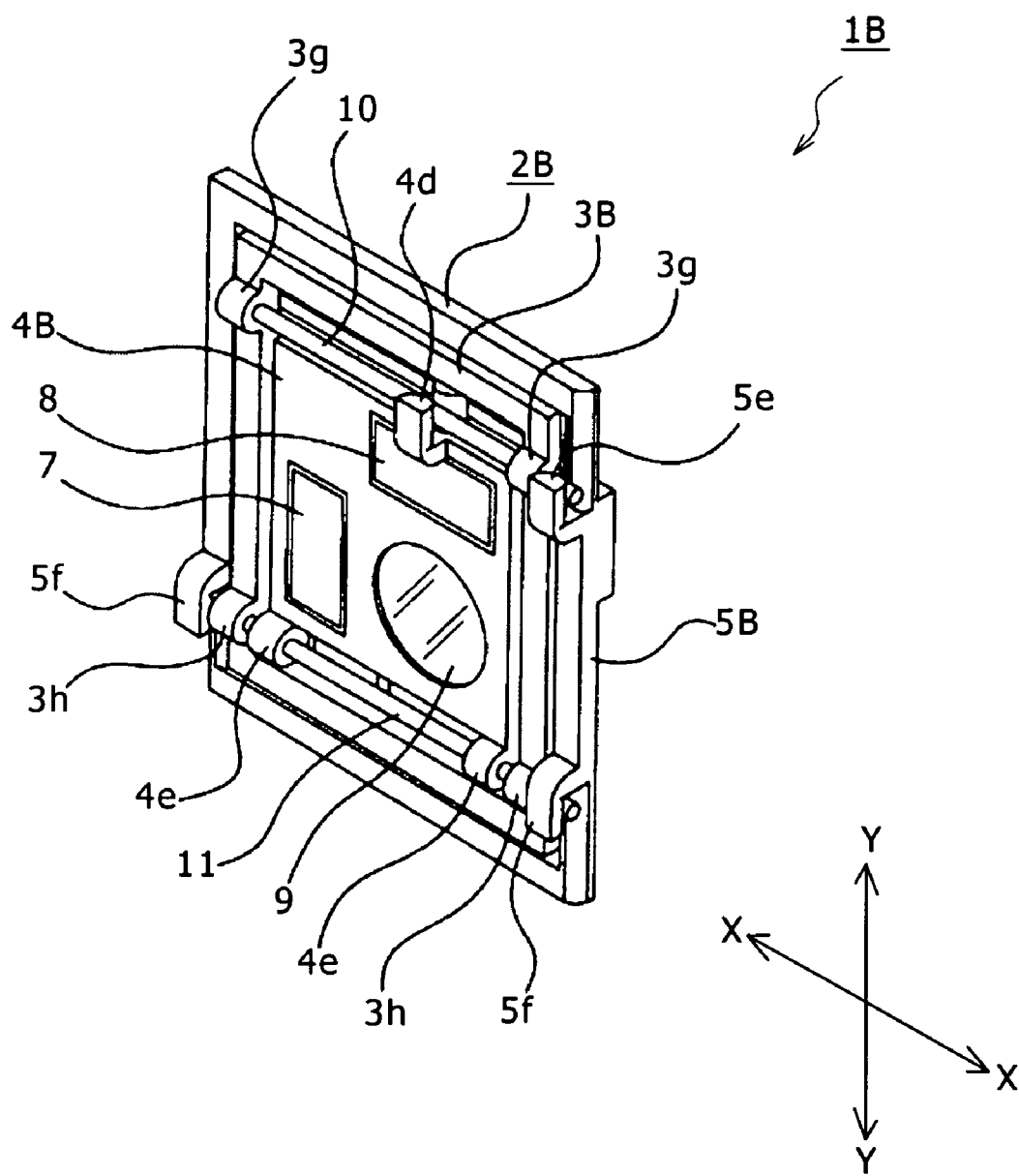
FIG. 12 is a perspective view showing a second modification to the image shake correction apparatus.
Figure 13:
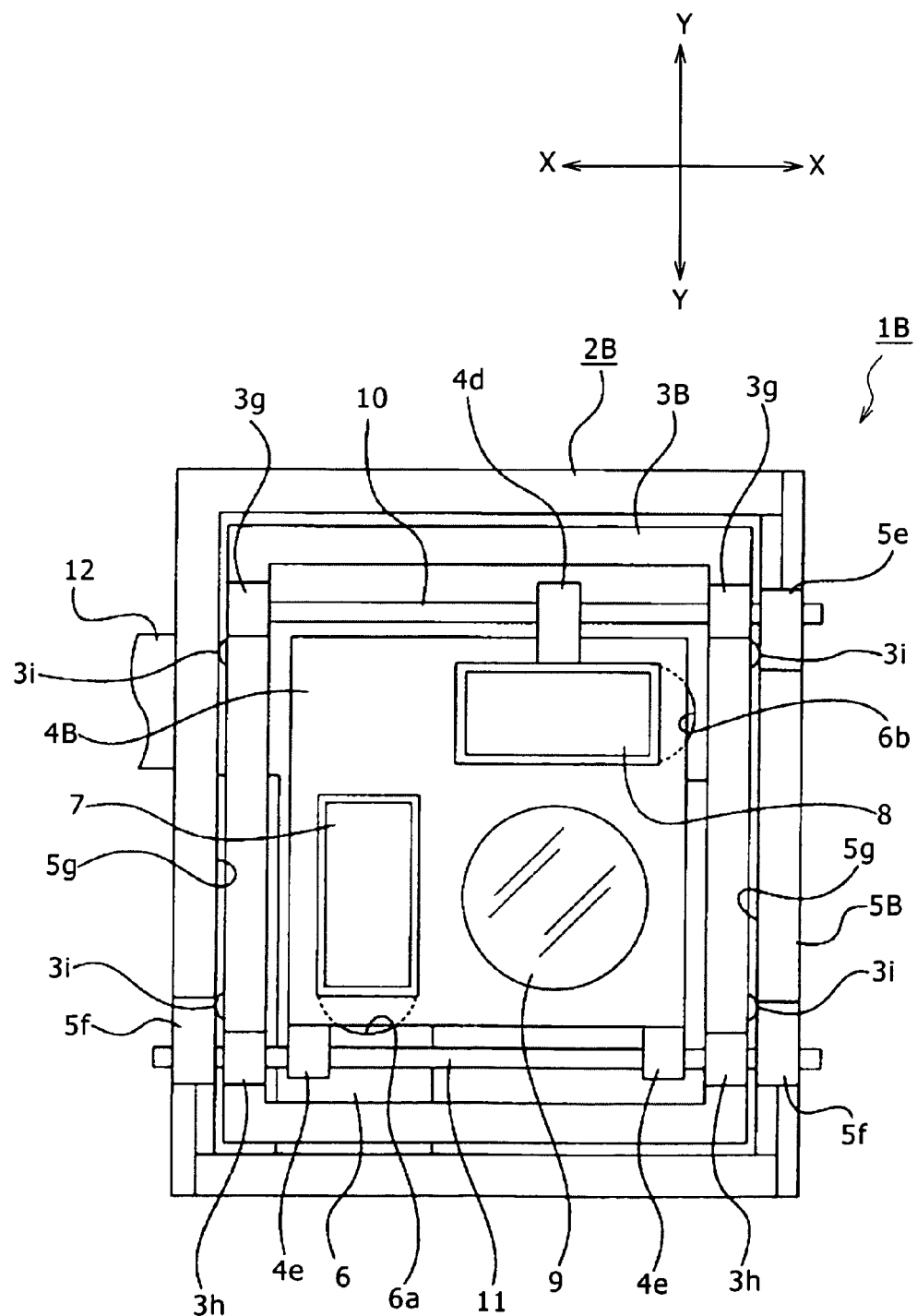
FIG. 13 is an enlarged front elevational view showing the modified image shake correction apparatus of FIG. 12.

Now, the image shake correction apparatus 1B according to the second modification is described with reference to FIGS. 12 and 13.

The image shake correction apparatus 1B has a fixed member 2B, an intermediate member 3B and a movable member 4B.

The fixed member 2B includes a framework-like portion 5B formed as a rectangular framework and an attaching face portion 6 provided on the inner side of the framework-like portion 5B.

A first channel-shaped bearing section 5e is provided at a position of a left end portion of the framework-like portion 5B of the fixed member 2B rather near to an upper end such that it projects forwardly and is open upwardly. A pair of second channel-shaped bearing sections 5f are provided in a leftwardly and rightwardly spaced relationship from each other at positions of the framework-like portion 5B of the fixed member 2B rather near to a lower end such that they project forwardly.

Portions of an inner peripheral face of the framework-like portion 5B of the fixed member 2B which are positioned on the left and the right are formed as movement restraining sections 5g.

The intermediate member 3B is formed as a rectangular framework one size smaller then the framework-like portion 5B of the fixed member 2B.

A pair of first round bearing sections 3g are provided in a leftwardly and rightwardly spaced relationship from each other at positions of the intermediate member 3B rather near to an upper end such that they project forwardly. A circular bearing hole is formed leftwardly and rightwardly through each of the first round bearing sections 3g. A pair of second round bearing sections 3h are provided in a leftwardly and rightwardly spaced relationship from each other at positions of the intermediate member 3B rather near to a lower end such that they project forwardly. A circular bearing hole is formed leftwardly and rightwardly through each of the second round bearing sections 3h.

A plurality of restrained projections 3i are provided at the opposite upper and lower end portions of the opposite left and right side faces of the intermediate member 3B such that they project outwardly. The restrained projections 3i function as restrained portions and each has an outer face formed as a moderately curved face which is convex to the outer side.

The movable member 4B is formed as a rectangular plate and has an outer shape smaller than the inner shape of the intermediate member 3B.

A channel-shaped bearing section 4d is provided at an upper end portion of the movable member 4B such that it projects upwardly and is open upwardly. A pair of round bearing sections 4e are provided in a leftwardly and rightwardly spaced relationship from each other at a lower end portion of the movable member 4B such that they project forwardly. A circular bearing hole is formed leftwardly and rightwardly through each of the round bearing sections 4e.

A guide shaft 10 is supported for sliding movement on the first channel-shaped bearing section 5e of the fixed member 2B such that it extends in the first direction, and a guide shaft 11 is supported for sliding movement on and between the second channel-shaped bearing sections 5f and extends in the leftward and rightward direction.

A flexible printed wiring board 12 is attached to a rear face of the attaching face portion 6 of the fixed member 2B.

The intermediate member 3B is disposed on the inner periphery side of the framework-like portion 5B of the fixed member 2B with the guide shaft 10 thereof fixedly attached to and between the first round bearing sections 3g and with the guide shaft 11 fixedly attached to and between the second round bearing sections 3h. The intermediate member 3B is movable in the second direction integrally with the guide shafts 10 and 11 on the inner periphery side of the framework-like portion 5B with respect to the fixed member 2B.

In a state wherein the intermediate member 3B is fixed to the guide shafts 10 and 11, the restrained projections 3i of the intermediate member 3B are positioned in the proximity of or contact with the movement restraining sections 5g of the fixed member 2B such that the intermediate member 3B can slidably move. Accordingly, although the intermediate member 3B is restrained from movement in the first direction with respect to the fixed member 2B by the movement restraining sections 5g, it is moved in the second direction with respect to the fixed member 2B.

The movable member 4B is disposed on the inner periphery side of the intermediate member 3B with the channel-shaped bearing section 4d thereof supported for sliding movement on the guide shaft 10 and with the round bearing sections 4e thereof supported for sliding movement on the guide shaft 11.

The channel-shaped bearing section 4d and the round bearing sections 4e are slidably moved on the guide shafts 10 and 11 such that the movable member 4B can be slidably moved in the first direction with respect to the fixed member 2B and the intermediate member 3B.

In the image shake correction apparatus 1B configured in such a manner as described above, if current is supplied to the first driving coil 13, then leftward or rightward thrust is applied to the movable member 4B in response to the direction of the supplied current in a relation to the first driving magnet 7. Consequently, the movable member 4B is moved in the first direction with respect to the fixed member 2B and the intermediate member 3B. On the other hand, if current is supplied to the second driving coil 14, then upward or downward thrust is applied to the movable member 4B in response to the direction of the supplied current in a relation to the second driving magnet 8. Consequently, the movable member 4B is moved in the second direction integrally with the intermediate member 3B with respect to the fixed member 2B.

As the movable member 4B which holds the lens 9 or the image pickup apparatus is moved in the first direction and the second direction as described above, image shake is corrected.

It is to be noted that while, in the example described above, the first channel-shaped bearing section 5e and the second channel-shaped bearing sections 5f are provided on the fixed member 2B and the channel-shaped bearing section 4d is provided on the movable member 4B, also it is possible to replace each of the channel-shaped bearing sections 5e, 5f and 4d with a bearing section having an upwardly and downwardly elongated hole.

Since, in the image shake correction apparatus 1B, the movement restraining sections 5g are formed integrally on the fixed member 2B as described above, reduction in number of parts and simplification in mechanism can be anticipated.

Further, in the image shake correction apparatus 1B, since the outer peripheral portion of the fixed member 2B is formed as a framework and the inner peripheral face of the fixed member 2B is formed as the movement restraining sections 5g while the restrained projections 3i are provided on the outer peripheral face of the intermediate member 3B, the structure is simple and reduction of the production cost can be anticipated.

Further, in the image shake correction apparatus 1B, since both of the intermediate member 3B and the movable member 4B are supported on the guide shafts 10 and 11 supported on the fixed member 2B, the accuracy in position of the movable member 4B in the direction of the optical axis and the accuracy in gradient of the movable member 4B with respect to the optical axis rely upon the accuracy in position of the guide shafts 10 and 11 but do not rely upon the accuracy in position and the accuracy in gradient of the intermediate member 3B with respect to the fixed member 2B. Accordingly, since the accuracy in position and the accuracy in gradient of the lens 9 or the image pickup apparatus held on the movable member 4B do not rely upon the accuracy in position of the intermediate member 3B, improvement in accuracy of the operation position in shake correction can be anticipated.

It is to be noted that, while, in the example described above, the movement restraining sections 5g in the form of a flat face are formed on the fixed member 2B and the restrained projections 3i in the form of a projection are provided on the intermediate member 3B, also it is possible to form the movement restraining sections 5g as a projection and form the restrained projections 3i as a flat face.

<Third Modification>

Figure 14:
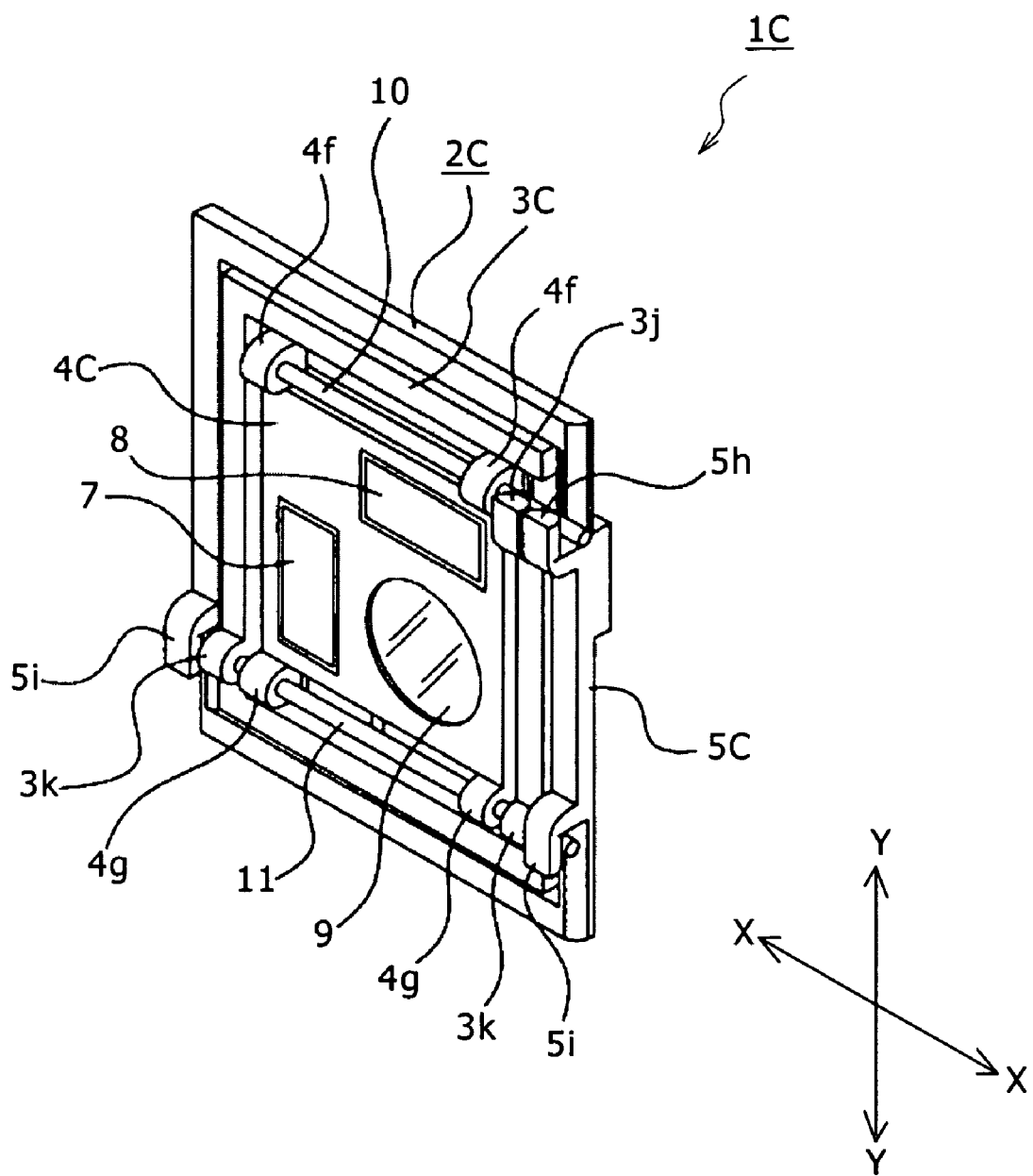
FIG. 14 is a perspective view showing a third modification to the image shake correction apparatus.
Figure 15:
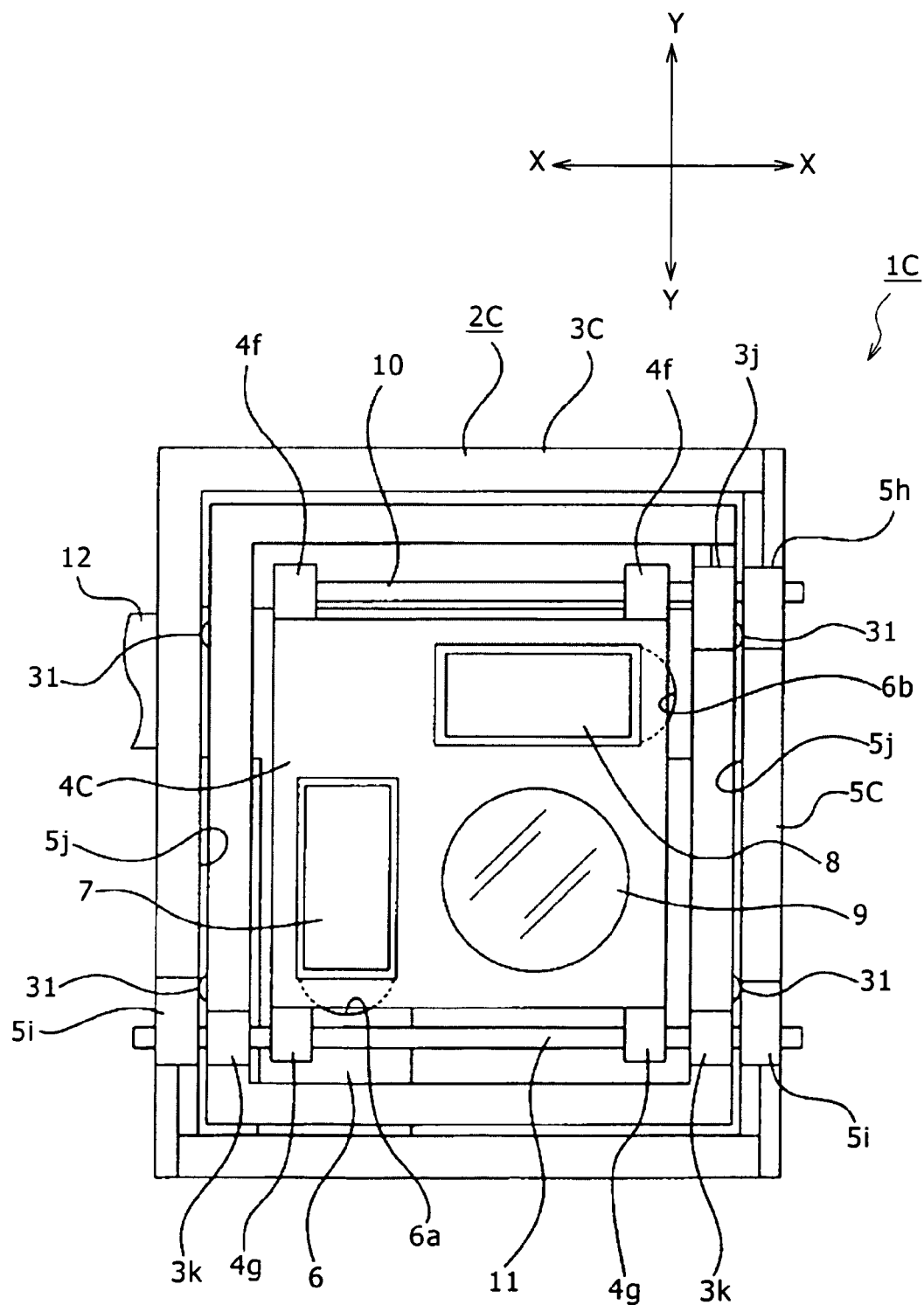
FIG. 15 is an enlarged front elevational view showing the modified image shake correction apparatus of FIG. 14.

Now, the image shake correction apparatus 1C according to the third modification is described with reference to FIGS. 14 and 15.

The image shake correction apparatus 1C has a fixed member 2C, an intermediate member 3C and a movable member 4C.

The fixed member 2C includes a framework-like portion 5C formed as a rectangular framework and an attaching face portion 6 provided on the inner side of the framework-like portion 5C.

A first channel-shaped bearing section 5h is provided at a position of a left end portion of the framework-like portion 5C of the fixed member 2C rather near to an upper end such that it projects forwardly and is open upwardly. A pair of second channel-shaped bearing sections 5i are provided in a leftwardly and rightwardly spaced relationship from each other at a position of the framework-like portion 5C of the fixed member 2C rather near to a lower end such that they project forwardly.

Portions of an inner peripheral face of the framework-like portion 5C of the fixed member 2C which are positioned on the left and the right are formed as movement restraining sections 5j.

The intermediate member 3C is formed as a rectangular framework one size smaller than the framework-like portion 5C of the fixed member 2C.

A channel-shaped bearing section 3j is provided at a position of a left end portion of the intermediate member 3C rather near to an upper end such that it projects forwardly and is open upwardly. A pair of round bearing sections 3k are provided in a leftwardly and rightwardly spaced relationship from each other at positions of the intermediate member 3C rather near to a lower end such that they project forwardly. A circular bearing hole is formed leftwardly and rightwardly through each of the round bearing sections 3k.

A plurality of restrained projections 3l are provided at the opposite upper and lower end portions of the opposite left and right side faces of the intermediate member 3C such that they project outwardly. The restrained projections 3l function as restrained portions and each has an outer face formed as a moderately curved face which is convex to the outer side.

The movable member 4C is formed as a rectangular plate and has an outer shape smaller than the inner shape of the intermediate member 3C.

A pair of first round bearing sections 4f are provided in a leftwardly and rightwardly spaced relationship from each other at an upper end portion of the movable member 4C such that they project forwardly. A circular bearing hole is formed leftwardly and rightwardly through each of the first round bearing sections 4f. A pair of second round bearing sections 4g are formed in a leftwardly and rightwardly spaced relationship from each other at lower end portions of the movable member 4C such that they project forwardly. A circular bearing hole is formed leftwardly and rightwardly through each of the second round bearing sections 4g.

A guide shaft 10 is supported for sliding movement on the first channel-shaped bearing section 5h of the fixed member 2C such that it extends in the first direction, and a guide shaft 11 is supported for sliding movement on and between the second channel-shaped bearing sections 5*i* and extends in the leftward and rightward direction.

A flexible printed wiring board 12 is attached to a rear face of the attaching face portion 6 of the fixed member 2C.

The intermediate member 3C is disposed on the inner periphery side of the framework-like portion 5C of the fixed member 2C with the channel-shaped bearing section 3*j* thereof supported for sliding movement on the guide shaft 10 and with the round bearing sections 3*k* thereof supported for sliding movement on the guide shaft 11. The intermediate member 3C is movable in the second direction on the inner periphery side of the framework-like portion 5C with respect to the fixed member 2C.

In a state wherein the intermediate member 3C is fixed to the guide shafts 10 and 11, the restrained projections 3*l* of the intermediate member 3C are positioned in the proximity of or contact with the movement restraining sections 5*j* of the fixed member 2C such that the intermediate member 3C can slidably move. Accordingly, although the intermediate member 3C is restrained from movement in the first direction with respect to the fixed member 2C by the movement restraining sections 5*j*, it is moved in the second direction with respect to the fixed member 2C.

The movable member 4C is disposed on the inner periphery side of the intermediate member 3C with the guide shaft 10 fixedly attached to and between the first round bearing sections 4*f* thereof and with the guide shaft 11 fixedly attached to and between the second round bearing sections 4*g* thereof.

The movable member 4C is movable in the first direction integrally with the guide shafts 10 and 11 with respect to the fixed member 2C and the intermediate member 3C.

In the image shake correction apparatus 1C configured in such a manner as described above, if current is supplied to the first driving coil 13, then leftward or rightward thrust is applied to the movable member 4C in response to the direction of the supplied current in a relation to the first driving magnet 7. Consequently, the movable member 4C is moved in the first direction with respect to the fixed member 2C and the intermediate member 3C. On the other hand, if current is supplied to the second driving coil 14, then upward or downward thrust is applied to the movable member 4C in response to the direction of the supplied current in a relation to the second driving magnet 8. Consequently, the movable member 4C is moved in the second direction integrally with the intermediate member 3C with respect to the fixed member 2C.

As the movable member 4C which holds the lens 9 or the image pickup apparatus is moved in the first direction and the second direction as described above, image shake is corrected.

It is to be noted that while, in the example described above, the first channel-shaped bearing section 5*h* and the second channel-shaped bearing sections 5*i* are provided on the fixed member 2C and the channel-shaped bearing section 3*j* is provided on the intermediate member 3C, also it is possible to replace each of the channel-shaped bearing sections 5*h*, 5*i* and 3*j* with a bearing section having an upwardly and downwardly elongated hole.

Since, in the image shake correction apparatus 1C, the movement restraining sections 5*j* are formed integrally on the fixed member 2C as described above, reduction in number of parts and simplification in mechanism can be anticipated.

Further, in the image shake correction apparatus 1C, since the outer peripheral portion of the fixed member 2C is formed as a framework and the inner peripheral face of the fixed member 2C is formed as the movement restraining sections 5*j* while the restrained projections 3*l* are provided on the outer peripheral face of the intermediate member 3C, the structure is simple and reduction of the production cost can be anticipated.

Further, in the image shake correction apparatus 1C, since both of the intermediate member 3C and the movable member 4C are supported on the guide shafts 10 and 11 supported on the fixed member 2C, the accuracy in position of the movable member 4C in the direction of the optical axis and the accuracy in gradient of the movable member 4C with respect to the optical axis rely upon the accuracy in position of the guide shafts 10 and 11 but do not rely upon the accuracy in position and the accuracy in gradient of the intermediate member 3C with respect to the fixed member 2C. Accordingly, since the accuracy in position and the accuracy in gradient of the lens 9 or the image pickup apparatus held on the movable member 4C do not rely upon the accuracy in position of the intermediate member 3C, improvement in accuracy of the operation position in shake correction can be anticipated.

It is to be noted that, while, in the example described above, the movement restraining sections 5*j* in the form of a flat face are formed on the fixed member 2C and the restrained projections 3*l* in the form of a projection are provided on the intermediate member 3C, also it is possible to otherwise form the movement restraining sections 5*j* as a projection and form the restrained projections 3*l* as a flat face.

Second Embodiment

Figure 16:
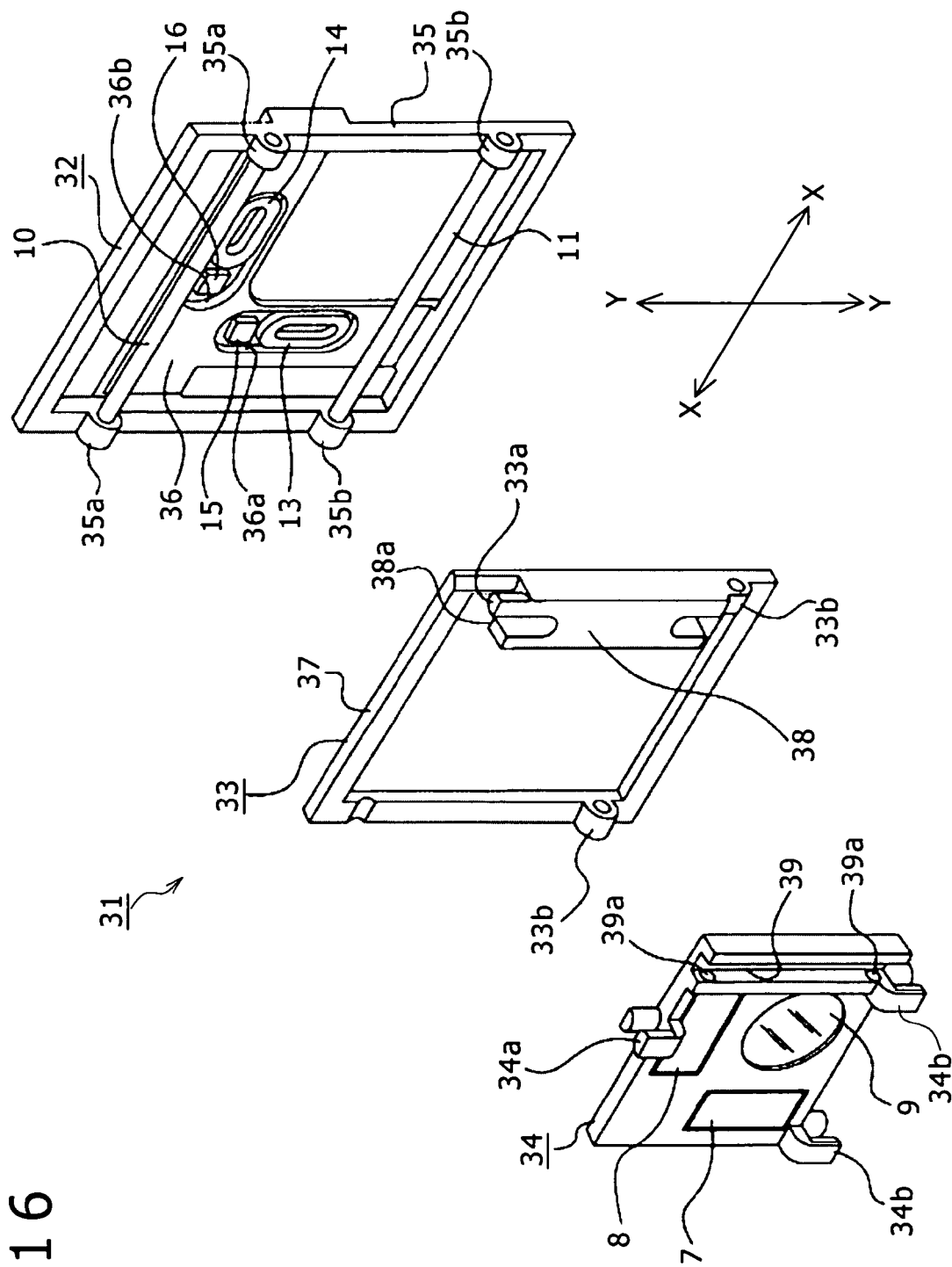
FIG. 16 is an exploded perspective view showing an image shake correction apparatus according to a second embodiment of the present invention.
Figure 17:
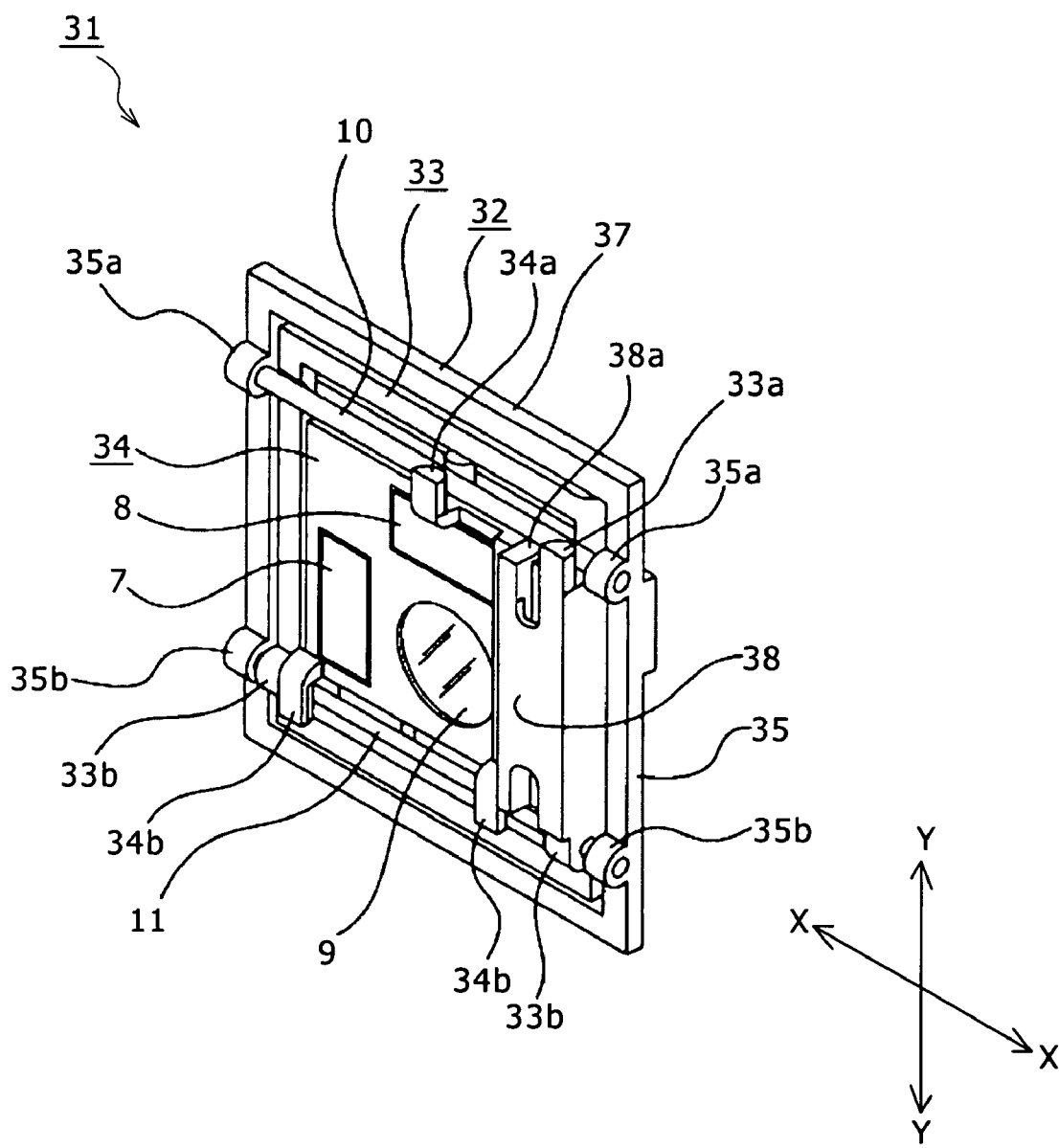
FIG. 17 is a perspective view of the image shake correction apparatus of FIG. 16.
Figure 18:
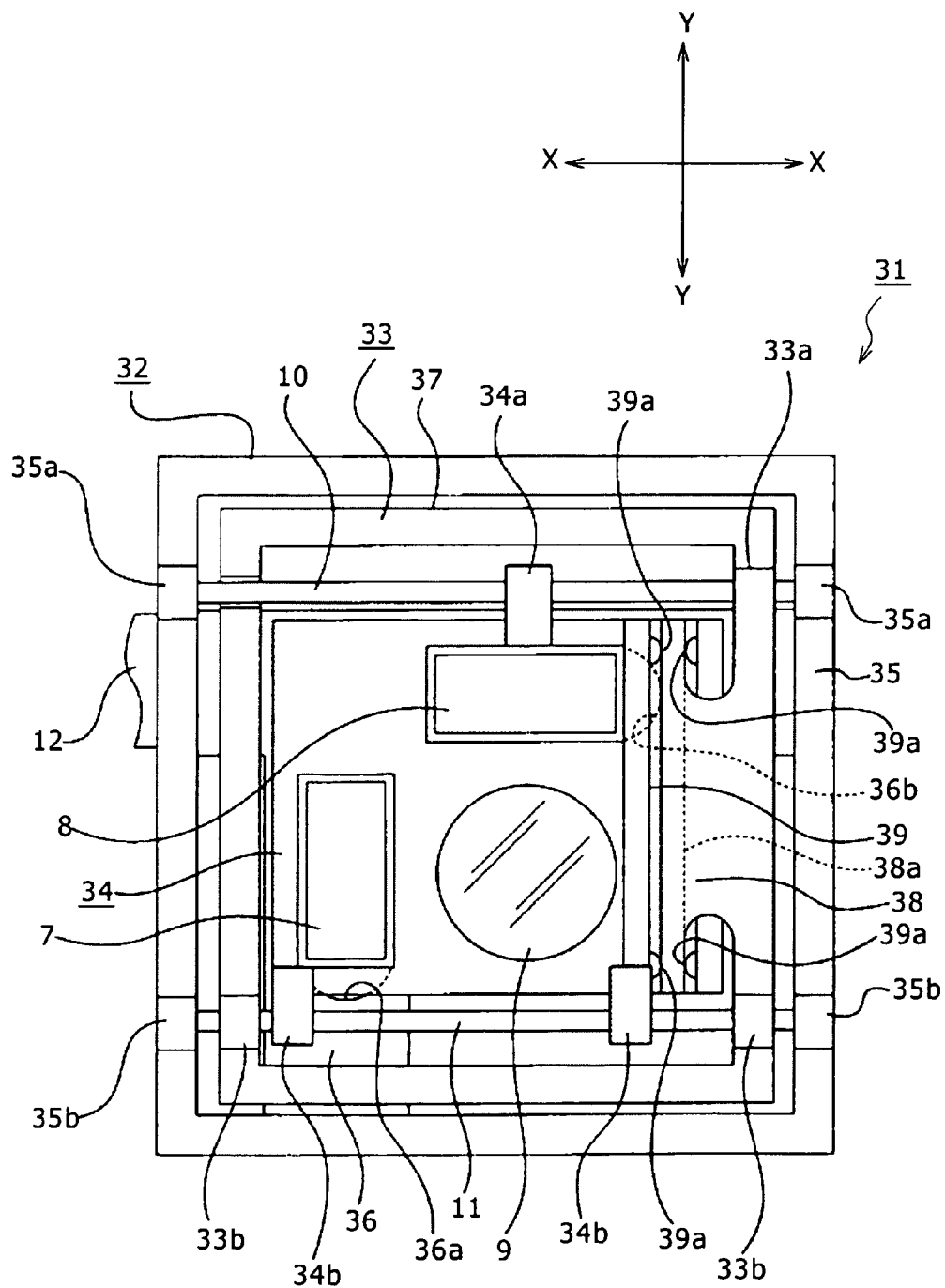
FIG. 18 is an enlarged front elevational view of the image shake correction apparatus of FIG. 16.

In the following, the image pickup correction apparatus according to a second embodiment of the present invention is described with reference to FIGS. 16 to 18.

The image shake correction apparatus 31 includes a fixed member 32, an intermediate member 33 and a movable member 34.

The fixed member 32 includes a framework-like portion 35 formed like a rectangular framework and an attaching face portion 36 provided on the inner side of the framework-like portion 35. The fixed member 32 is secured, for example, to a holding tube not shown provided as an external housing for a lens barrel.

A pair of first round bearing sections 35*a* are provided in a leftwardly and rightwardly spaced relationship from each other at positions of the framework-like portion 35 of the fixed member 32 rather near to an upper end and project forwardly. A circular bearing hole is formed leftwardly and rightwardly through each of the first round bearing sections 35*a*. A pair of second round bearing sections 35*b* are provided in a spaced relationship from each other at positions of the framework-like portion 35 of the fixed member 32 rather near to a lower end and project forwardly. A circular bearing hole is formed leftwardly and rightwardly through each of the second round bearing sections 35*b*.

The attaching face portion 36 of the fixed member 32 is provided such that it connects the rear face of the framework-like portion 35, and a vertically elongated first disposition hole 36*a* and a horizontally elongated second disposition hole 36*b* are formed on the attaching face portion 36.

The intermediate member 33 includes a framework-like outer periphery portion 37 formed as a rectangular framework one size smaller than the framework-like portion 35 of the fixed member 32 and a projection 38 projecting rightwardly from the front face side of a left end portion of the framework-like outer periphery portion 37 and is formed as a unitary member made of, for example, synthetic resin.

A restraining projection 38*a* is provided at a right end portion of the projection 38 such that it projects rearwardly and extends in the upward and downward direction. The restraining projection 38a functions as a movement restraining section for restraining movement of the movable member 34 in the first direction with respect to the intermediate member 33.

A channel-shaped bearing section 33a is provided at a position of a left end portion of the intermediate member 33 rather near to an upper end and projects forwardly such that it is open upwardly. A pair of round bearing sections 33b are provided in a leftwardly and rightwardly spaced relationship from each other at positions of the intermediate member 33 rather near to a lower end and project forwardly. A circular bearing hole is formed leftwardly and rightwardly through each of the round bearing sections 33b.

The movable member 34 is formed as a rectangular plate and has an outer shape smaller than the inner shape of the framework-like outer periphery portion 37 of the intermediate member 33.

A vertically elongated first driving magnet 7 and a horizontally elongated second driving magnet 8 are attached in an embedded state to the movable member 34. A lens 9 is held on the movable member 34 and functions as a lens for correction. It is to be noted that the lens 9 may be replaced by an image pickup device such as a CCD device or a CMOS device.

A first channel-shaped bearing section 34a is provided at an upper end portion of the movable member 34 and is open upwardly. A pair of second channel-shaped bearing sections 34b are provided in a leftwardly and rightwardly spaced relationship from each other at a lower end portion of the movable member 34 and are open downwardly.

A restrained groove 39 is formed at a left end portion of the movable member 34 such that it extends in the upward and downward direction and functions as a restrained portion. A plurality of restrained projections 39a are provided at the opposite upper and lower end portions of the opposite side faces of the restrained groove 39 and project inwardly. The restrained projections 39a are each formed as a moderately curved face which is convex in the outward direction.

A guide shaft 10 is fixedly attached to the fixed member 32 and extends in the leftward and rightward direction between the first round bearing sections 35a. A guide shaft 11 is fixedly secured to the fixed member 32 and extends in the leftward and rightward direction between the second round bearing sections 35b.

A flexible printed wiring board 12 is attached to a rear face of the attaching face portion 36 of the fixed member 32, and a vertically elongated first driving coil 13 and a horizontally elongated second driving coil 14 are attached to the front face of the flexible printed wiring board 12. A first detection element 15 and a second detection element 16 are attached to positions of the front face of the flexible printed wiring board 12 which are adjacent the first driving coil 13 and the second driving coil 14, respectively. For example, a Hall device is used for the first detection element 15 and the second detection element 16. A reinforcing plate 17 is attached to the rear face of the flexible printed wiring board 12.

In a state wherein the flexible printed wiring board 12 is attached to the rear face of the attaching face portion 36, the first driving coil 13 and the first detection element 15 are inserted and disposed in the first disposition hole 36a and the second driving coil 14 and the second detection element 16 are inserted and disposed in the second disposition hole 36b.

The intermediate member 33 is supported at the channel-shaped bearing section 33a thereof for sliding movement on the guide shaft 10 and at the round bearing sections 33b thereof for sliding movement on the guide shaft and is disposed on the inner periphery side of the framework-like portion 35 of the fixed member 32. Accordingly, the intermediate member 33 is movable in the first direction on the inner periphery side of the framework-like portion 35 with respect to the fixed member 32 through the guide shafts 10 and 11.

The movable member 34 is supported at the first channel-shaped bearing section 34a thereof for sliding movement on the guide shaft 10 and at the second channel-shaped bearing sections 34b thereof for sliding movement on the guide shaft 11 and is disposed on the inner periphery side of the intermediate member 33.

In a state wherein the movable member 34 is supported on the guide shafts 10 and 11, the first driving magnet 7 is positioned in an opposing relationship to and forwardly of the first driving coil 13 and the first detection element 15, and the second driving magnet 8 is positioned in an opposing relationship to and forwardly of the second driving coil 14 and the second detection element 16.

In the state wherein the movable member 34 is supported on the guide shafts 10 and 11, the restraining projection 38a of the intermediate member 33 is inserted in the restrained groove 39 of the movable member 34 and the restrained projections 39a are positioned in the proximity of or contact with the opposite left and right side faces of the restraining projection 38a such that the movable member 34 can slidably move. Accordingly, although the movable member 34 is restrained from movement in the first direction with respect to the intermediate member 33 by the restraining projection 38a, upon movement of the intermediate member 33 in the first direction with respect to the fixed member 32, the movable member 34 is moved in the first direction integrally with the intermediate member 33 with respect to the fixed member 32.

The first channel-shaped bearing section 34a and the second channel-shaped bearing sections 34b are slidably moved on the guide shafts 10 and 11 such that the movable member 34 is movable in the second direction with respect to the fixed member 32 and the intermediate member 33.

In the image shake correction apparatus 31 having such a configuration as described above, if current is supplied to the first driving coil 13, then leftward or rightward thrust is applied to the movable member 34 in response to the direction of the supplied current in a relation to the first driving magnet 7. Consequently, the intermediate member 33 and the movable member 34 are moved integrally with each other in the first direction with respect to the fixed member 32. On the other hand, if current is supplied to the second driving coil 14, then upward or downward thrust is applied to the movable member 34 in response to the direction of the supplied current in a relation to the second driving magnet 8. Consequently, the movable member 34 is moved in the second direction with respect to the intermediate member 33 and the fixed member 32.

As the movable member 34 which holds the lens 9 or the image pickup apparatus is moved in the first direction and the second direction as described above, image shake is corrected. At this time, the position of the movable member 34 with respect to the fixed member 32 is detected at any time by the first detection element 15 and the second detection element 16, and appropriate operation of the movable member 34 is achieved.

It is to be noted that, while, in the example described above, the channel-shaped bearing section 33a is provided on the intermediate member 33 and the first channel-shaped bearing section 34a and the second channel-shaped bearing sections 34b are provided on the movable member 34, it is possible to replace each of the channel-shaped bearing sections 33a, 34a and 34b with a bearing section having an upwardly and downwardly elongated hole.

As described above, in the image shake correction apparatus 31, since the movement restraining sections 38a are formed integrally on the intermediate member 33, reduction in number of parts and simplification in mechanism can be anticipated.

Further, in the image shake correction apparatus 31, since the restraining projection 38a in the form of a projection which extends in the upward and downward direction is provided on the intermediate member 33 and the restrained groove 39 is formed on the movable member 34 such that it extends in the upward and downward direction and functions as a restrained portion, the structure is simple and reduction of the production cost can be anticipated.

Furthermore, in the image shake correction apparatus 31, since the intermediate member 33 and the movable member 34 are supported on the guide shafts 10 and 11 both supported on the fixed member 32, the accuracy in position of the movable member 34 in the direction of the optical axis and the accuracy in gradient of the movable member 34 with respect to the optical axis depend upon the accuracy in position of the guide shafts 10 and 11 but do not rely upon the accuracy in position and the accuracy in gradient of the intermediate member 33 with respect to the fixed member 32. Accordingly, since the accuracy in position of the lens 9 or the image pickup apparatus held on the movable member 34 does not rely upon the accuracy in position of the intermediate member 33, improvement in accuracy of the operation position in shake correction can be anticipated.

It is to be noted that, while, in the example described above, the restraining projection 38a in the form of a projection which functions as a movement restraining section is provided on the intermediate member 33 and the restrained groove 39 of a concave shape which functions as a restrained portion is formed on the movable member 34, it is otherwise possible to conversely form the movement restraining section in a concave shape and form the restrained portion as a projection.

Third Embodiment

Figure 19:
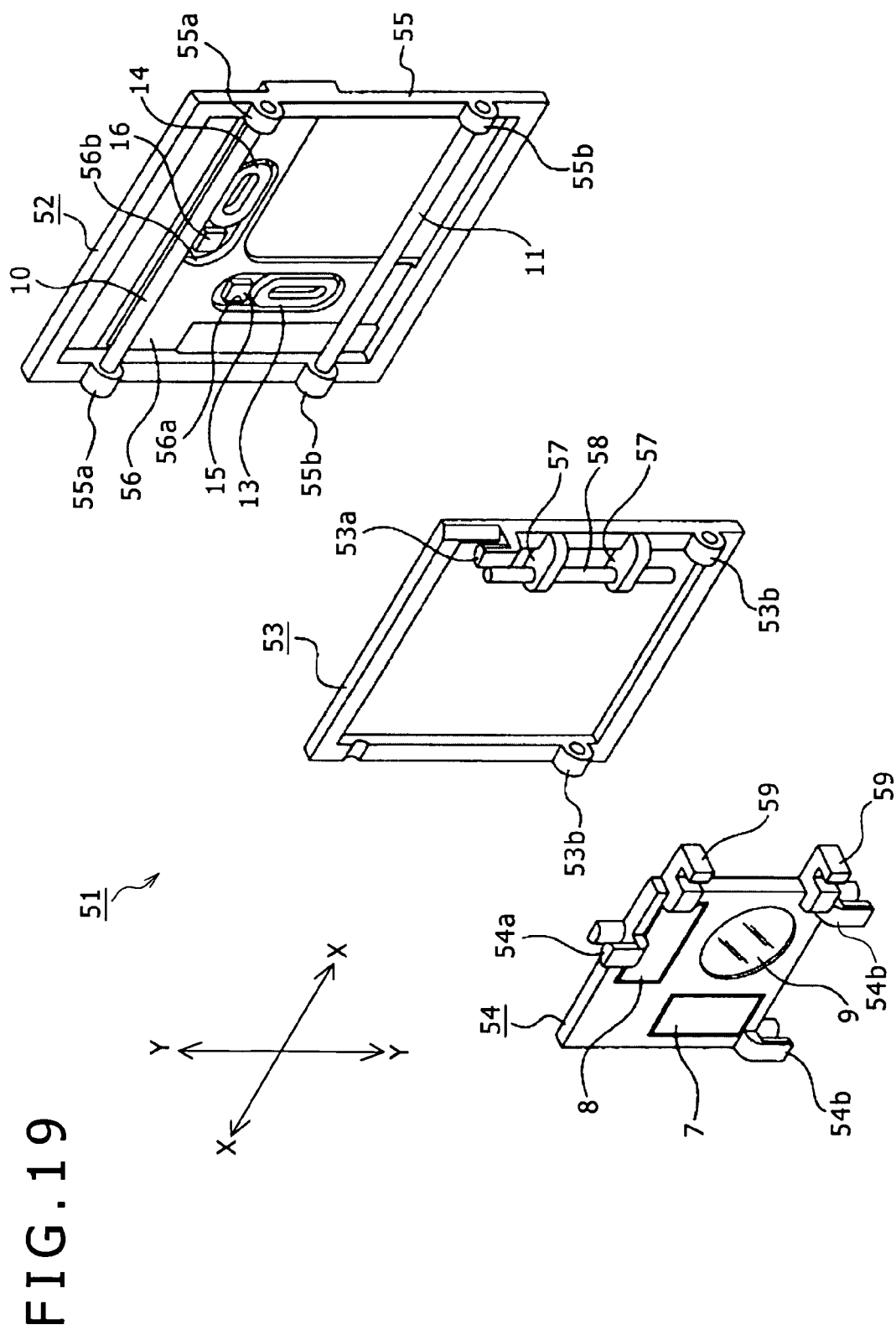
FIG. 19 is an exploded perspective view showing an image shake correction apparatus according to a third embodiment of the present invention.
Figure 20:
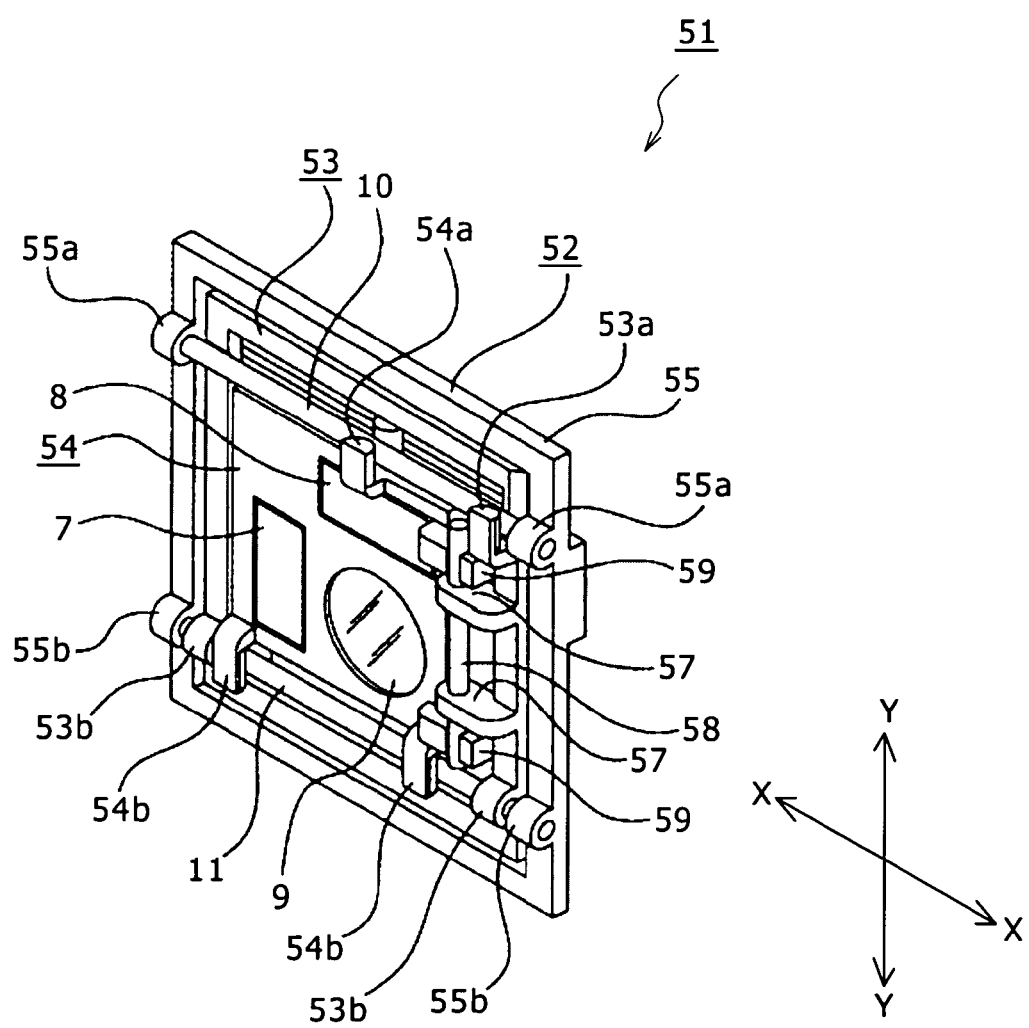
FIG. 20 is a perspective view of the image shake correction apparatus of FIG. 19.
Figure 21:
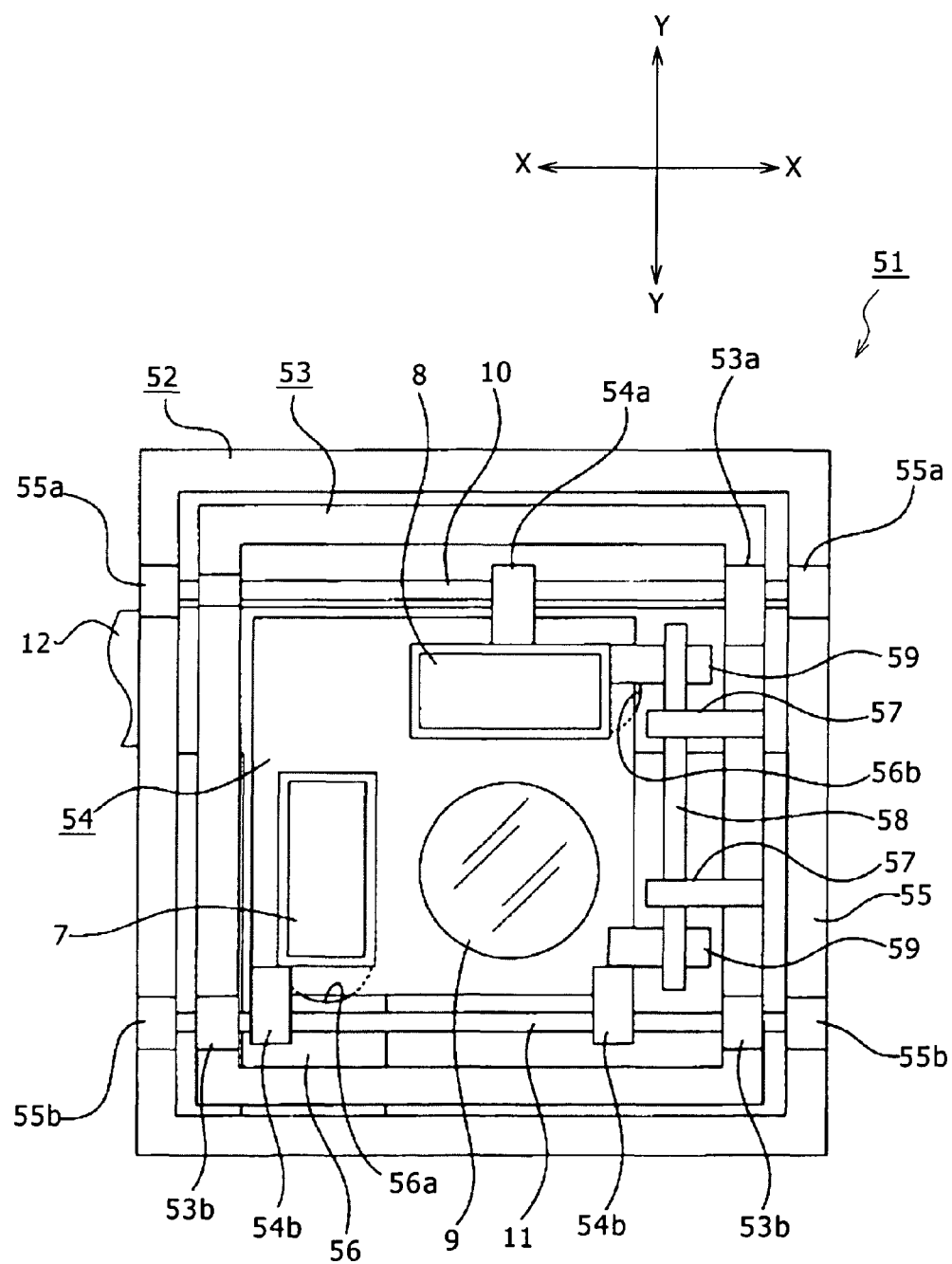
FIG. 21 is an enlarged front elevational view of the image shake correction apparatus of FIG. 19.

In the following, the image pickup correction apparatus according to a third embodiment of the present invention is described with reference to FIGS. 19 to 21.

The image shake correction apparatus 51 includes a fixed member 52, an intermediate member 53 and a movable member 54.

The fixed member 52 includes a framework-like portion 55 formed like a rectangular framework and an attaching face portion 56 provided on the inner side of the framework-like portion 55. The fixed member 52 is secured, for example, to a holding tube not shown provided as an external housing for a lens barrel.

A pair of first round bearing sections 55a are provided in a leftwardly and rightwardly spaced relationship from each other at positions of the framework-like portion 55 of the fixed member 52 rather near to an upper end and project forwardly. A circular bearing hole is formed leftwardly and rightwardly through each of the first round bearing sections 55a. A pair of second round bearing sections 55b are provided in a spaced relationship from each other at positions of the framework-like portion 55 of the fixed member 52 rather near to a lower end and project forwardly. A circular bearing hole is formed leftwardly and rightwardly through each of the second round bearing sections 55b.

The attaching face portion 56 of the fixed member is provided such that it connects the rear face of the framework-like portion 55, and a vertically elongated first disposition hole 56a and a horizontally elongated second disposition hole 56b are formed on the attaching face portion 56.

The intermediate member 53 is formed as a rectangular framework one size smaller than the framework-like portion 55 of the fixed member 52 and has a pair of fixing pieces 57 projecting rightwardly from the front face side of a left end portion thereof. A restraining shaft 58 made of metal material is secured to the fixing pieces 57 such that it extends upwardly and downwardly. The restraining shaft 58 is provided as a movement restraining section for restraining movement of the movable member 54 in the first direction with respect to the intermediate member 53. The restraining shaft 58 is in a state wherein the opposite upper and lower end portions thereof project upwardly and downwardly from the fixing pieces 57.

A channel-shaped bearing section 53a is provided at a position of a left end portion of the intermediate member 53 rather near to an upper end and projects forwardly such that it is open upwardly. A pair of round bearing sections 53b are provided in a leftwardly and rightwardly spaced relationship from each other at positions of the intermediate member 53 rather near to a lower end and project forwardly. A circular bearing hole is formed leftwardly and rightwardly through each of the round bearing sections 53b.

The movable member 54 is formed as a rectangular plate and has an outer shape smaller than the inner shape of the intermediate member 53.

A vertically elongated first driving magnet 7 and a horizontally elongated second driving magnet 8 are attached in an embedded state to the movable member 54. A lens 9 is held on the movable member 54 and functions as a lens for correction. It is to be noted that the lens 9 may be replaced by an image pickup device such as a CCD device or a CMOS device.

A first channel-shaped bearing section 54a is provided at an upper end portion of the movable member 54 and is open upwardly. A pair of second channel-shaped bearing sections 4b are provided in a leftwardly and rightwardly spaced relationship from each other at a lower end portion of the movable member 54 and are open downwardly.

A pair of restrained bearing sections 59 are provided in an upwardly and downwardly spaced relationship from each other at a left end portion of the movable member 54 such that they extend leftwardly and are formed in a channel shape open forwardly. The restrained bearing sections 59 function as restrained portions.

A guide shaft 10 is fixedly attached to the fixed member 52 and extends in the leftward and rightward direction between the first round bearing sections 55a. A guide shaft 11 is fixedly secured to the fixed member 52 and extends in the leftward and rightward direction between the second round bearing sections 55b.

A flexible printed wiring board 12 is attached to a rear face of the attaching face portion 56 of the fixed member 52, and a vertically elongated first driving coil 13 and a horizontally elongated second driving coil 14 are attached to the front face of the flexible printed wiring board 12. A first detection element 15 and a second detection element 16 are attached to positions of the front face of the flexible printed wiring board 12 which are adjacent the first driving coil 13 and the second driving coil 14, respectively. For example, a Hall device is used for the first detection element 15 and the second detection element 16. A reinforcing plate 17 is attached to the rear face of the flexible printed wiring board 12.

In a state wherein the flexible printed wiring board 12 is attached to the rear face of the attaching face portion 56, the first driving coil 13 and the first detection element 15 are inserted and disposed in the first disposition hole 56a and the second driving coil 14 and the second detection element 16 are inserted and disposed in the second disposition hole 56b.

The intermediate member 53 is supported at the channel-shaped bearing section 53a thereof for sliding movement on the guide shaft 10 and at the round bearing sections 53b thereof for sliding movement on the guide shaft 11 and is disposed on the inner periphery side of the framework-like portion 55 of the fixed member 52. Accordingly, the intermediate member 53 is movable in the first direction on the inner periphery side of the framework-like portion 55 with respect to the fixed member 52 through the guide shafts 10 and 11.

The movable member 54 is supported at the first channel-shaped bearing section 54a thereof for sliding movement on the guide shaft 10 and at the second channel-shaped bearing sections 54b thereof for sliding movement on the guide shaft 11 and is disposed on the inner periphery side of the intermediate member 53.

In a state wherein the movable member 54 is supported on the guide shafts 10 and 11, the first driving magnet 7 is positioned in an opposing relationship to and forwardly of the first driving coil 13 and the first detection element 15, and the second driving magnet 8 is positioned in an opposing relationship to and forwardly of the second driving coil 14 and the second detection element 16.

In the state wherein the movable member 54 is supported on the guide shafts 10 and 11, the restrained bearing sections 59 of the movable member 54 are supported for sliding movement on the restraining shaft 58. Accordingly, although the movable member 54 is restrained from movement in the first direction with respect to the intermediate member 53 by the restraining shaft 58, upon movement of the intermediate member 53 in the first direction with respect to the fixed member 52, the movable member 54 is moved in the first direction integrally with the intermediate member 53 with respect to the fixed member 52.

The first channel-shaped bearing section 54a and the second channel-shaped bearing sections 54b are slidably moved on the guide shafts 10 and 11 such that the movable member 54 is movable in the second direction with respect to the fixed member 52 and the intermediate member 53.

In the image shake correction apparatus 51 having such a configuration as described above, if current is supplied to the first driving coil 13, then leftward or rightward thrust is applied to the movable member 54 in response to the direction of the supplied current in a relation to the first driving magnet 7. Consequently, the intermediate member 53 and the movable member 54 are moved integrally with each other in the first direction with respect to the fixed member 52. On the other hand, if current is supplied to the second driving coil 14, then upward or downward thrust is applied to the movable member 54 in response to the direction of the supplied current in a relation to the second driving magnet 8. Consequently, the movable member 54 is moved in the second direction with respect to the intermediate member 53 and the fixed member 52.

As the movable member 54 which holds the lens 9 or the image pickup apparatus is moved in the first direction and the second direction as described above, image shake is corrected. At this time, the position of the movable member 54 with respect to the fixed member 52 is detected at any time by the first detection element 15 and the second detection element 16, and appropriate operation of the movable member 54 is achieved.

It is to be noted that, while, in the example described above, the channel-shaped bearing section 53a is provided on the intermediate member 53 and the first channel-shaped bearing section 54a and the second channel-shaped bearing sections 54b are provided on the movable member 54, it is possible to replace each of the channel-shaped bearing sections 53a, 54a and 54b with a bearing section having an upwardly and downwardly elongated hole.

As described above, in the image shake correction apparatus 51, since the restraining shaft 58 which is formed from metal material and functions as a movement restraining section is secured to the intermediate member 53 and the restrained bearing sections 59 of the movable member 54 are supported for sliding movement on the restraining shaft 58, the movable member 54 can be moved in the second direction smoothly.

Further, in the image shake correction apparatus 51, since the restraining shaft 58 extending upwardly and downwardly is secured to the intermediate member 53 and the restrained bearing sections 59 which are supported on the movable member 54 and function as restrained portions are provided on the movable member 54 and engage for sliding movement with the restraining shaft 58, the structure is simple and reduction of the production cost can be anticipated.

Furthermore, in the image shake correction apparatus 51, since the intermediate member 53 and the movable member 54 are supported on the guide shafts 10 and 11 both supported on the fixed member 52, the accuracy in position of the movable member 54 in the direction of the optical axis and the accuracy in gradient of the movable member 54 with respect to the optical axis depend upon the accuracy in position of the guide shafts 10 and 11 but do not rely upon the accuracy in position and the accuracy in gradient of the intermediate member 53 with respect to the fixed member 52. Accordingly, since the accuracy in position of the lens 9 or the image pickup apparatus held on the movable member 54 does not rely upon the accuracy in position of the intermediate member 53, improvement in accuracy of the operation position in shake correction can be anticipated.

It is to be noted that, while, in the example described above, the restrained bearing sections 59 of the movable member 54 are supported for sliding movement on the restraining shaft 58 and the restraining shaft 58 is secured to the intermediate member 53, it is otherwise possible to secure the restraining shaft 58 to the restrained bearing sections 59 and support the intermediate member 53 for sliding movement on the restraining shaft 58.

In this instance, since the intermediate member 53 is formed from metal material and is supported for sliding movement on the restraining shaft 58 which functions as a movement restraining section, the intermediate member 53 can be moved in the second direction smoothly.

As described above, in the image shake correction apparatus 1, 1A, 1B, 1C, 31 and 51, an element which functions as a movement restraining section for restraining movement of the movable member 4, 4A, 34 or 54 in the first direction with respect to the intermediate member 3, 3A, 33 or 53 or movement of the intermediate member 3B or 3C in the first direction with respect to the fixed member 2B or 2C is provided. Further, in the image shake correction apparatus 1, 1A, 1B, 1C, 31 and 51, an element which functions as a restrained portion which is engaged at two locations in the second direction with the movement restraining section is provided. Furthermore, in the image shake correction apparatus 1, 1A, 1B, 1C, 31 and 51, the movable member 4, 4A, 4B, 4C, 34 or 54 is supported on the pair of guide shafts 10 and 11 disposed in a spaced relationship from each other in the second direction.

Accordingly, upon movement of the movable member 4, 4A, 4B, 4C, 34 or 54 in the first direction and the second direction, rotation of the movable member 4, 4A, 4B, 4C, 34 or 54 in a plane perpendicular to the direction of the optical axis is prevented and smooth movement in the first direction and the second direction can be assured.

Further, since the intermediate member 3, 3A, 3B, 3C, 33 or 53 is disposed on the inner periphery side of the framework-like portion 5, 5A, 5B, 5C, 35 or 55 of the fixed member 2, 2A, 2B, 2C, 32 or 52, reduction in thickness of the image shake correction apparatus 1, 1A, 1B, 1C, 31 and 51 can be anticipated.

Furthermore, since the movable member 4, 4A, 4B, 4C, 34 or 54 is disposed on the inner periphery side of the intermediate member 3, 3A, 3B, 3C, 33 or 53, further reduction in thickness of the image shake correction apparatus 1, 1A, 1B, 1C, 31 and 51 can be achieved.

In addition, where the direction of movement of the movable member 4, 4A, 4B, 4C, 34 or 54 with respect to the fixed member 2, 2A, 2B, 2C, 32 or 52 is set to the direction of the gravity, the holding force corresponding to the gravity is required only for the movable member 4, 4A, 4B, 4C, 34 or 54 which does not include the intermediate member 3, 3A, 3B, 3C, 33 or 53. Consequently, the power consumption can be reduced and improvement of the performance for shake correction can be anticipated as much.

It is to be noted that, while, in the foregoing description, the first direction is the leftward and rightward direction and the second direction is the upward and downward direction, the first direction and the second direction are not limited to the specific directions but may be any directions only if they are perpendicular to the direction of the optical axis and perpendicular to each other.

[Image Pickup Apparatus]

Figure 22:
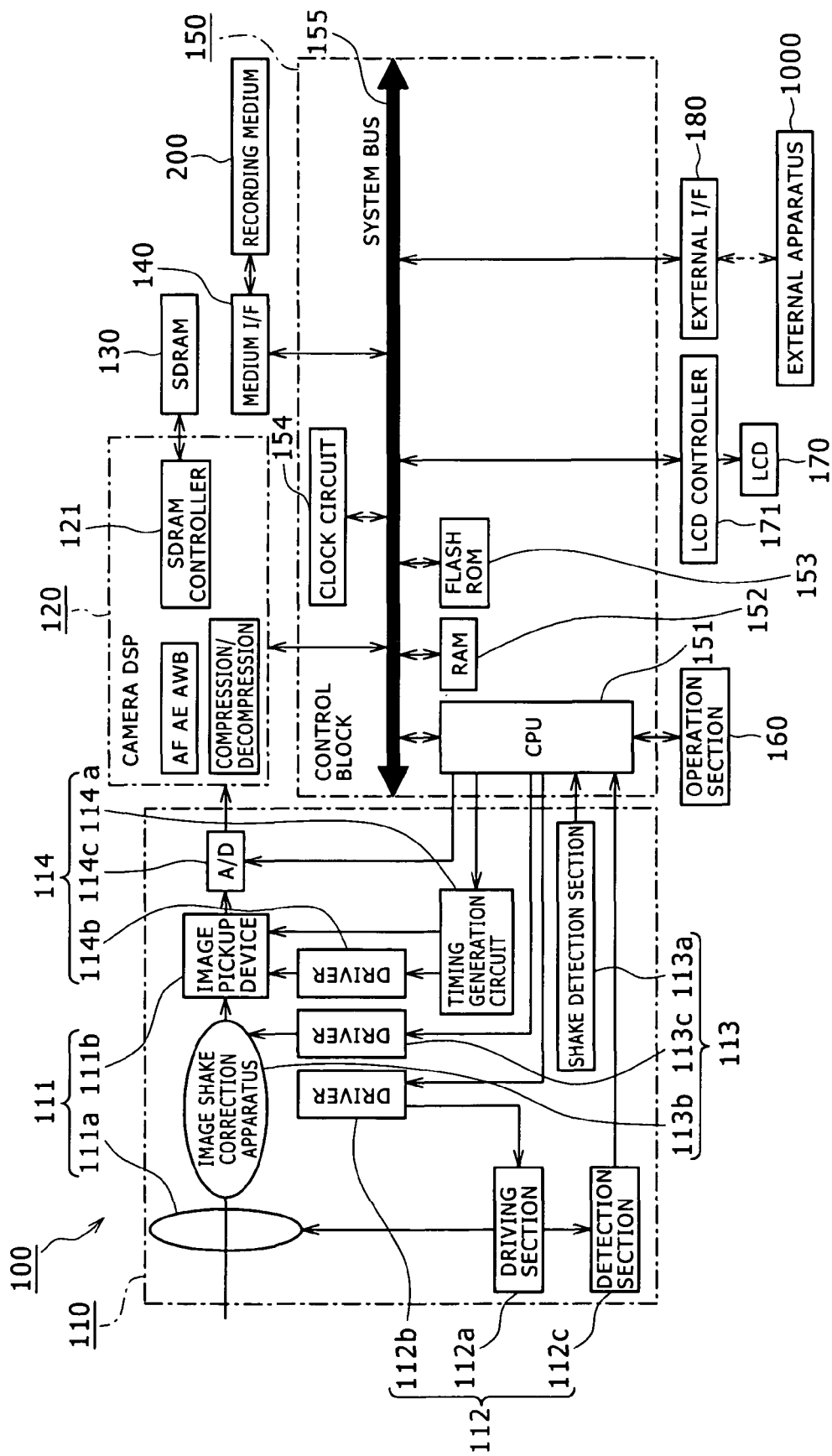
FIG. 22 is a block diagram showing an example of an image pickup apparatus.

Now, an example of an image pickup apparatus is described with reference to FIG. 22.

The image pickup apparatus 100 includes a camera block 110, a camera DSP (Digital Signal Processor) 120, an SDRAM (Synchronous Dynamic Random Access Memory) 130, a medium interface 140, a control block 150, an operation section 160, an LCD (Liquid Crystal Display) unit 170, and an external interface 180. A recording medium 200 can be removably loaded into the image pickup apparatus 100.

For the recording medium 200, various recording media can be used such as a memory card in which a semiconductor memory is used, a disk type recording medium such as a recordable DVD (Digital Versatile Disk) or a recordable CD (Compact Disc) and so forth.

The camera block 110 includes an image pickup section 111, a lens driving system 112, a camera shake correction system 113 and an image extraction section 114.

The image pickup section 111 has an image pickup lens 111a for obtaining an optical image and an image pickup device 111b for converting the obtained optical image into an electric signal. For the image pickup device 111b, for example, such a CCD image pickup device or a CMOS image pickup device as described hereinabove can be used.

The lens driving system 112 has a function of driving a movable lens in the image pickup lens 111a to carry out zooming and focusing. To this end, the lens driving system 112 has a driving section 112a such as a stepping motor for driving the movable lens, a driver 112b for signaling a driving signal to the driving section 112a and a detection section 112c for feeding back operation of the driving section 112a.

The camera shake correction system 113 detects image shake of the image pickup apparatus 100. To this end, the camera shake correction system 113 includes a shake detection section 113a such as a gyro sensor, and a driver 113c for operating an image shake correction apparatus 113b based on a result of the detection of the shake detection section 113a.

The image shake correction apparatus 113b corresponds to the image shake correction apparatus 1, 1A, 1B, 1C, 31 or 51 described hereinabove.

It is to be noted that, while the image shake correction apparatus 113b has the lens 9 which is moved in two directions perpendicular to the direction of the optical axis as described hereinabove, the image pickup device 111b such as a CCD image pickup device or a CMOS image pickup device may be used as a component of the camera shake correction system 113 in place of the lens 9.

The image extraction section 114 has a timing generation circuit 114a for generating a driving timing of the image pickup device 111b under the control of the control block 150, a driver 114b for driving the image pickup device 111b based on the timing generated by the timing generation circuit 114a, and an A/D conversion circuit 114c for converting an analog signal taken out from the image pickup device 111b into a digital signal.

The A/D conversion circuit 114c carries out a CDS (Correlated Double Sampling) process for image information in the form of an electric signal inputted thereto to assure a good S/N ratio and carries out an AGC (Automatic Gain Control) process to control the gain. Further, the A/D conversion circuit 114c carries out A/D (Analog/Digital) conversion to generate image data as a digital signal and so forth.

The camera DSP 120 carries out signal processing such as AF (Auto Focus), AE (Auto Exposure) and AWB (Auto White Balance) for the image data inputted thereto from the A/D conversion circuit 114c. The image data for which the signal processing such as AF, AE and AWB has been carried out are compressed in accordance with a predetermined method and outputted through the control block 150 to and recorded on the recording medium 200.

An SDRAM controller 121 is provided in the camera DSP 120, and reading out and writing of data are carried out at a high speed from and into the SDRAM 130 in accordance with an instruction of the SDRAM controller 121.

The control block 150 is a microcomputer which includes a CPU (Central Processing Unit) 151, a RAM (Random Access Memory) 152, a flash ROM (Read Only Memory) 153, a clock circuit 154 and so forth connected to each other through a system bus 155. The control block 150 has a function of controlling the components of the image pickup apparatus 100.

The CPU 151 signals an instruction signal to the drivers 112b and 113c and to the driver 114b through the timing generation circuit 114a to cause them to operate.

The RAM 152 is used principally as a working area for temporarily storing an intermediate result of processing.

The flash ROM 153 stores various programs to be executed by the CPU 151, data necessary for processing and so forth.

The clock circuit 154 outputs the date at present, the day of the week at present, the time at present, the date and time of image pickup and so forth.

The operation section 160 is a touch panel, control keys and so forth provided on an outer housing of the image pickup apparatus 100. If an operation is carried out for the operation section 160, then a signal corresponding to the operation is inputted to the CPU 151, and the CPU 151 signals various instruction signals based on the signal inputted thereto.

The LCD unit 170 is controlled by an LCD controller 171 connected to the system bus 155. The LCD unit 170 displays various kinds of information such as image data based on the driving signal from the LCD controller 171.

The external interface 180 is connected to the system bus 155. The external interface 180 is a connection section for connecting an external apparatus 1000 such as a personal computer to the image pickup apparatus 100. Where an external apparatus is connected to the image pickup apparatus 100 through the external interface 180, it is possible to receive image data from the external apparatus and record the image data on the recording medium 200 or output image data recorded in the recording medium 200 to the external apparatus. It is to be noted that the recording medium 200 is connected to the control block 150 through the medium interface 140 connected to the system bus 155.

Further, where an external apparatus such as a communication module is connected to the image pickup apparatus 100 through the external interface 180, it is possible, for example, to establish a connection to a network such as the Internet to acquire various image data or other information and record the acquired data or information on the recording medium 200 or transmit data recorded on the recording medium 200 to the opposite party through the network.

It is to be noted that it is possible to provide the external interface 180 as a wire interface complying with the IEEE (Institute of Electrical and Electronics Engineers) 1394, USB (Universal Serial Bus) or the like or as a wireless interface for optical or radio wave communication.

Image data recorded on the recording medium 200 are read out from the recording medium 200 in response to an operation signal corresponding to an operation for the operation section 160 carried out by the user and are signaled to the camera DSP 120 through the medium interface 140.

The camera DSP 120 carries out a data decompression process for the image data, which are in a compressed form, read out from the recording medium 200 and inputted to the camera DSP 120 and signals image data obtained by the decompression process to the LCD controller 171 through the system bus 155. The LCD controller 171 signals an image signal based on the image data inputted thereto to the LCD unit 170 so that an image based on the image signal is displayed on the LCD unit 170.

The image pickup apparatus 100 includes the image shake correction apparatus 1, 1A, 1B, 1C, 31 or 51 (113b) having such a configuration as described above. Accordingly, in the image pickup apparatus 100, upon movement of the movable member 4, 4A, 4B, 4C, 34 or 54 in the first direction and the second direction, rotation of the movable member 4, 4A, 4B, 4C, 34 or 54 in a plane perpendicular to the direction of the optical axis is prevented and smooth movement in the first direction and the second direction can be assured.

The particular shapes and structures of the components disclosed in the foregoing description indicate mere examples of embodiment in carrying out the present invention, and the technical scope of the present invention shall not be interpreted restrictively by them.

The present application contains subject matter related to that disclosed in Japanese Priority Patent Application JP 2009-051099 filed in the Japan Patent Office on Mar. 4, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image shake correction apparatus, comprising:
a fixed member fixed in three directions including a direction of an optical axis, a first direction perpendicular to the direction of the optical axis, and a second direction perpendicular to both of the direction of the optical axis and the first direction;
a pair of guide shafts supported on said fixed member so as to extend in the first direction and disposed in a spaced relationship from each other in the second direction;
an intermediate member supported on said pair of guide shafts for movement in one of the first and second directions but against movement in the other of the first and second directions with respect to said fixed member;
a movable member having a lens or an image pickup device held thereon and supported on said pair of guide shafts for movement in the first and second directions with respect to said fixed member and for movement in the other of the first and second directions but against movement in the one of the first and second directions with respect to said intermediate member;
a movement restraining section configured to restrain the movement of said movable member in the one of the first and second directions with respect to said intermediate member or restrain the movement of said intermediate member in the other of the first and second directions with respect to said fixed member; and
a restrained section provided on said movable member or said intermediate member for being engaged at least at two locations thereof by said movement restraining section in the second direction,
said intermediate member and said movable member being moved integrally with each other in the one of the first and second directions with respect to said fixed member while said movable member is moved in the other of the first and second directions with respect to said fixed member to carry out correction of image shake.

2. The image shake correction apparatus according to claim 1, wherein
said fixed member has an outer peripheral portion formed in the form of a framework, and
said intermediate member is positioned on the inner periphery side of the outer peripheral portion of said fixed member.

3. The image shake correction apparatus according to claim 2, wherein
said intermediate member is formed in the form of a framework, and
said movable member is positioned on the inner periphery side of said intermediate member.

4. The image shake correction apparatus according to claim 1, wherein when the movement restraining section is configured to restrain the movement of said movable member in the one of the first and second directions with respect to said intermediate member, said movement restraining section is formed integrally on said intermediate member.

5. The image shake correction apparatus according to claim 1, wherein when the movement restraining section is configured to restrain the movement of said movable member in the one of the first and second directions with respect to said intermediate member,
said intermediate member is formed in the form of a framework and has an inner peripheral face formed as said movement restraining section which restrains the movement of said movable member in the one of the first and second directions, and
a plurality of restrained projections which function as said restrained section are provided on an outer peripheral face of said movable member so as to slidably move on said movement restraining section upon movement in the other of the first and second directions.

6. The image shake correction apparatus according to claim 1, wherein when the movement restraining section is configured to restrain the movement of said movable member in the one of the first and second directions with respect to said intermediate member, a restraining projection which extends in the other of the first and second directions and functions as said movement restraining section which restrains the movement of said movable member in the one of the first and second directions is provided on said intermediate member, and a restrained groove which is supported for sliding movement on said restraining projection, extends in the other of the first and second directions and functions as said restrained section is formed on said movable member.

7. The image shake correction apparatus according to claim 1, wherein when the movement restraining section is configured to restrain the movement of said movable member in the one of the first and second directions with respect to said intermediate member, a restraining shaft is provided which extends in the other of the first and second directions and functions as said movement restraining section which restrains the movement of said movable member in the one of the first and second directions, a restrained bearing section which functions as said restrained section is provided on said movable member, and said restraining shaft is secured to said intermediate member and said restrained bearing section is supported for sliding movement on said restraining shaft or said restraining shaft is secured to said restrained bearing section and said intermediate member is supported for sliding movement on said restraining shaft.

8. The image shake correction apparatus according to claim 1, wherein when the movement restraining section is configured to restrain the movement of said intermediate member in the other of the first and second directions with respect to said fixed member, said movement restraining section is formed integrally on said fixed member.

9. The image shake correction apparatus according to claim 1, wherein when the movement restraining section is configured to restrain the movement of said intermediate member in the other of the first and second directions with respect to said fixed member, said fixed member has an outer peripheral portion formed in the form of a framework and an inner peripheral face of the outer peripheral portion is formed as said movement restraining section which restrains the movement of said intermediate member in the other of the first and second directions with respect to said fixed member, and a plurality of restrained projections which function as said restrained section are provided on an outer peripheral face of said intermediate member so as to slidably move on said movement restraining section upon movement in the one of the first and second directions.

10. The image shake correction apparatus according to claim 1, wherein said fixed member has a receiving portion, and said intermediate member has a position restraining projection provided thereon and projecting in the direction of the optical axis so as to be capable of contacting with said receiving portion in the direction of the optical axis.

11. The image shake correction apparatus according to claim 1, wherein said intermediate member has a position restraining projection provided thereon and projecting in the direction of the optical axis so as to be capable of contacting with a holding tube, which holds said fixed member thereon, in the direction of the optical axis.

12. The image shake correction apparatus according to claim 1, wherein when the movement restraining section is configured to restrain the movement of said movable member in the one of the first and second directions with respect to said intermediate member, the other of the first and second directions is the direction of gravity.

13. An image pickup apparatus, comprising an image shake correction apparatus for moving an lens or an image pickup device in a direction perpendicular to a direction of an optical axis to correct image shake, said image shake correction apparatus including a fixed member fixed in three directions including the direction of the optical axis, a first direction perpendicular to the direction of the optical axis, and a second direction perpendicular to both of the direction of the optical axis and the first direction, a pair of guide shafts supported on said fixed member so as to extend in the first direction and disposed in a spaced relationship from each other in the second direction, an intermediate member supported on said pair of guide shafts for movement in one of the first and second directions but against movement in the other of the first and second directions with respect to said fixed member, a movable member having a lens or an image pickup device held thereon and supported on said pair of guide shafts for movement in the first and second directions with respect to said fixed member and for movement in the other of the first and second directions but against movement in the one of the first and second directions with respect to said intermediate member, a movement restraining section configured to restrain the movement of said movable member in the one of the first and second directions with respect to said intermediate member or restrain the movement of said intermediate member in the other of the first and second directions with respect to said fixed member, and a restrained section provided on said movable member or said intermediate member for being engaged at least at two locations thereof by said movement restraining section in the second direction, said intermediate member and said movable member being moved integrally with each other in the one of the first and second directions with respect to said fixed member while said movable member is moved in the other of the first and second directions with respect to said fixed member to carry out correction of image shake.

14. The image pickup apparatus according to claim 13, wherein when the movement restraining section is configured to restrain the movement of said movable member in the one of the first and second directions with respect to said intermediate member, the other of the first and second directions is the direction of gravity.

* * * * *